United States Patent Office 3,093,010
Patented June 11, 1963

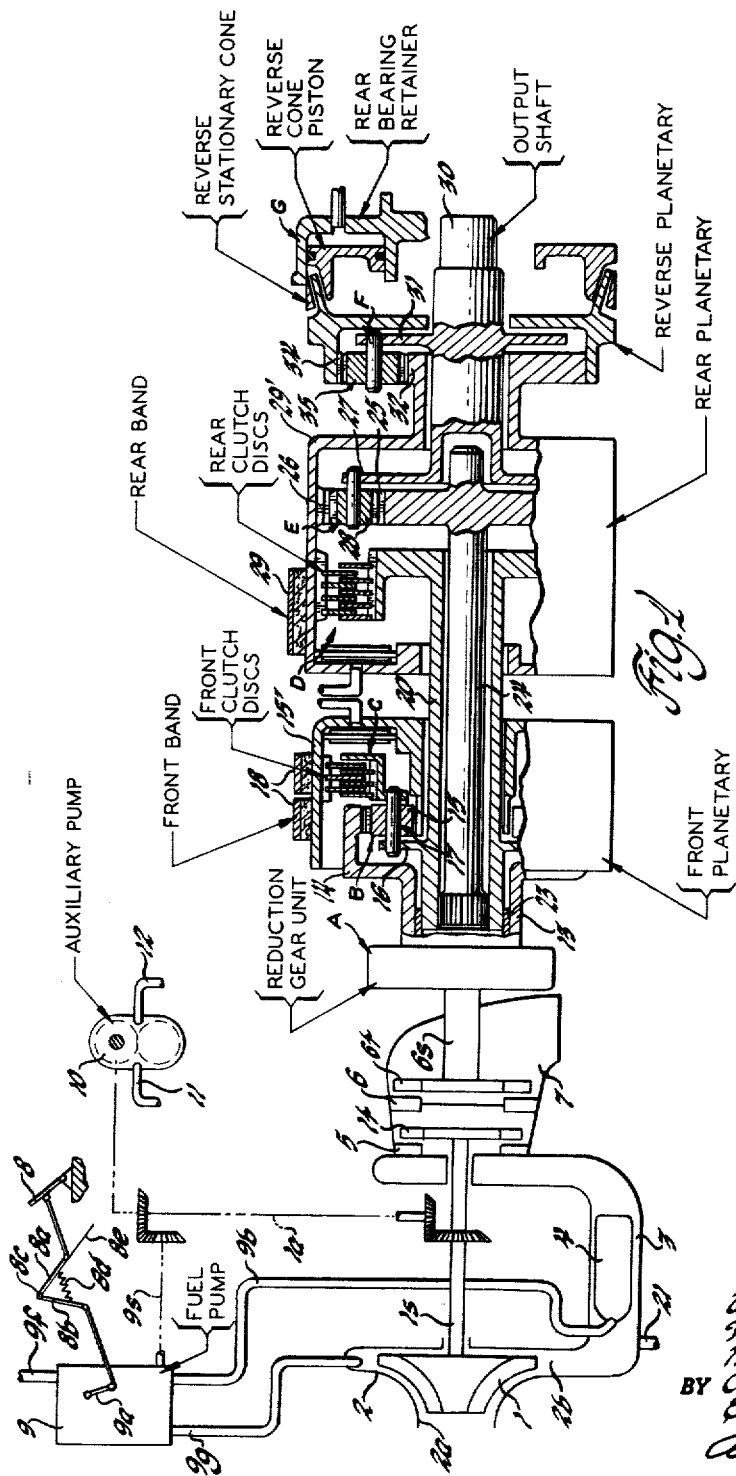

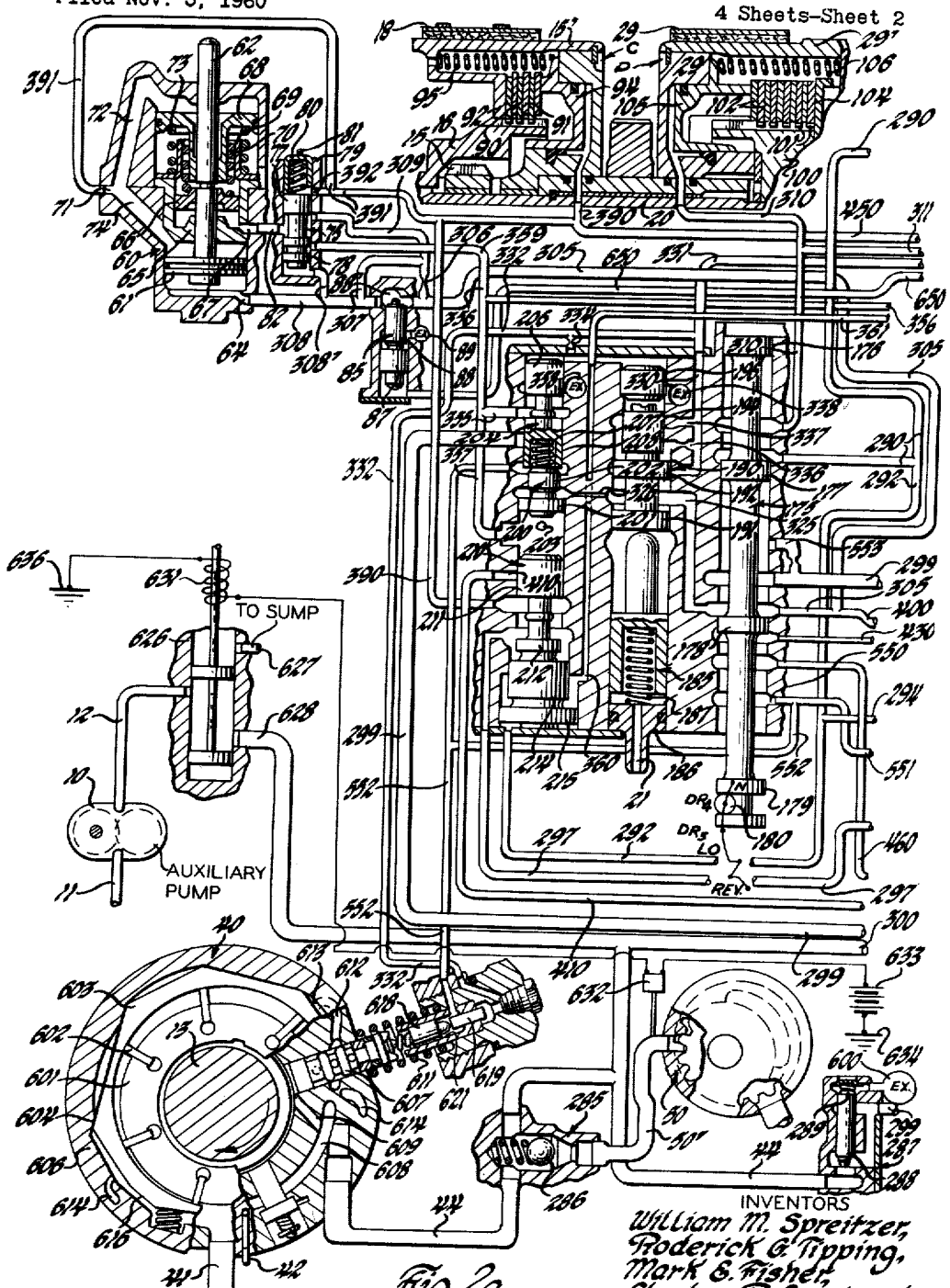

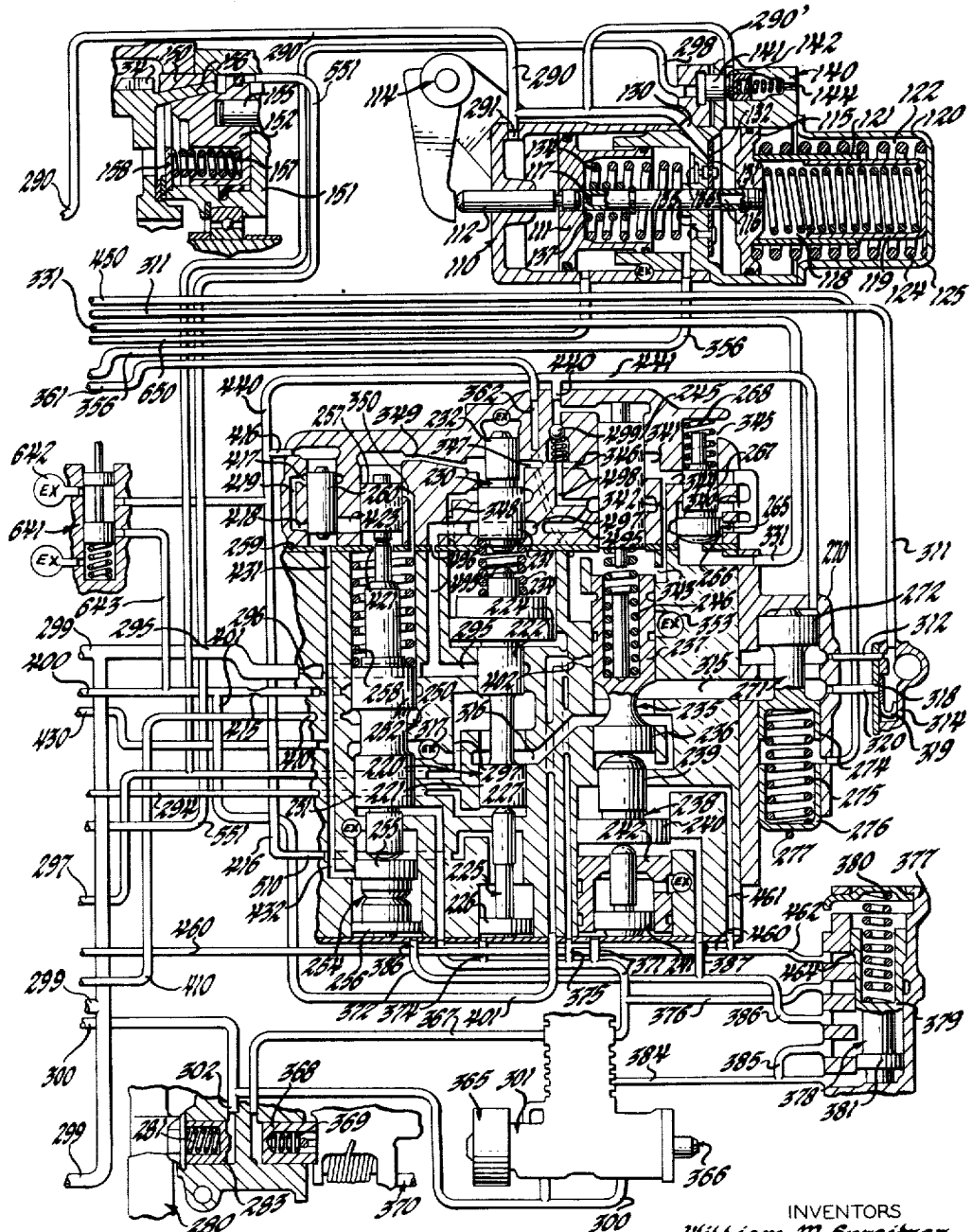

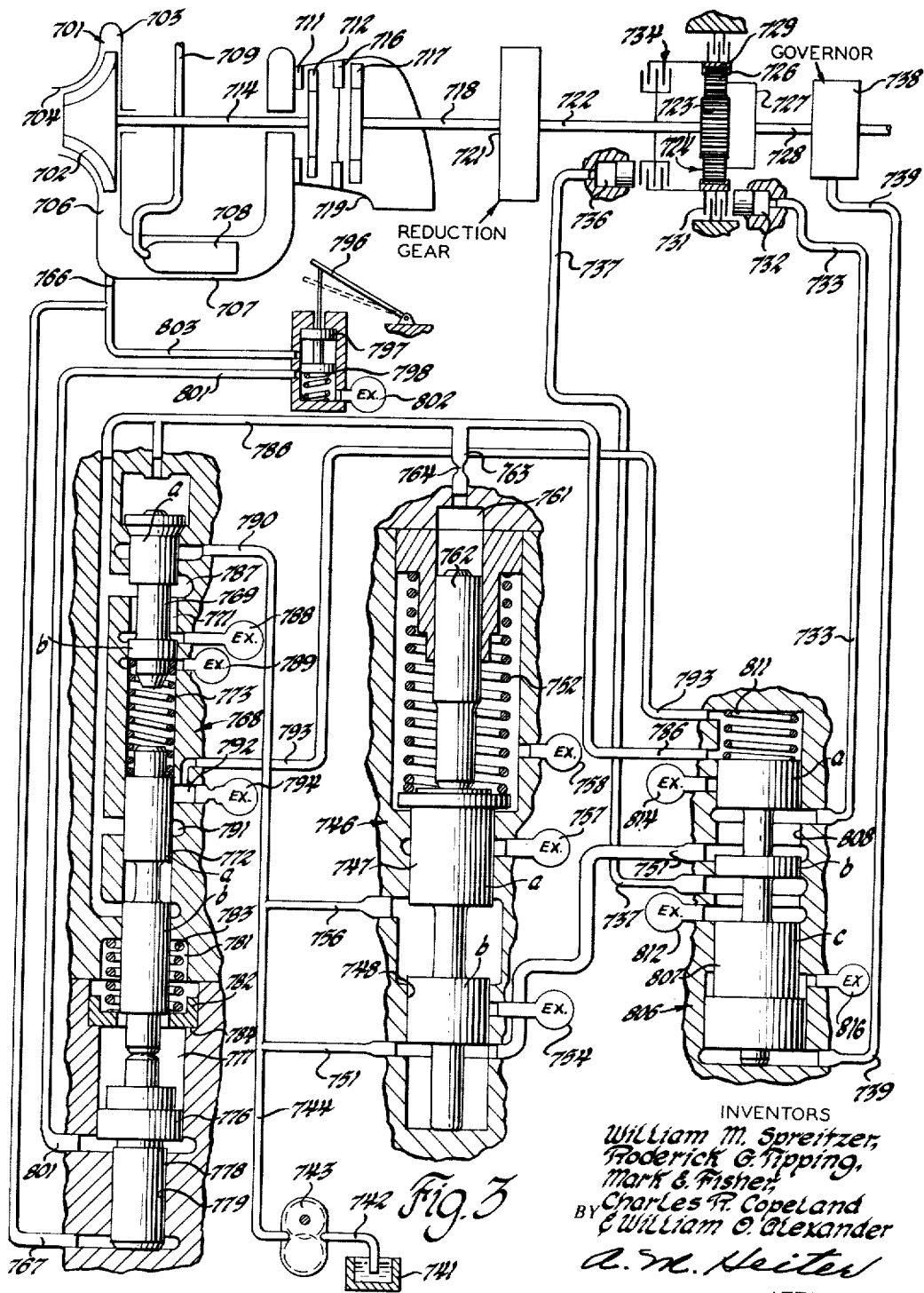

3,093,010
TRANSMISSION
William M. Spreitzer, Royal Oak, and Roderick G. Tipping, Inkster, Mich., and Mark E. Fisher, Carmel, Charles R. Copeland, Acton, and William O. Alexander, Plainfield, Ind., assignors to General Motors Corporation, Detroit, Mich., a corporation of Delaware
Filed Nov. 3, 1960, Ser. No. 67,069
23 Claims. (Cl. 74—472)

This invention relates to power plants and particularly a power plant employing a gas turbine engine and an automatic transmission.

In automatic transmissions when used in conjunction with internal combustion engines of the piston type, it has been customary to provide automatic shifts controlled by a signal corresponding to output or road wheel speed, and a signal corresponding to the torque or power demand on the engine. The torque or power demand signal is generally provided by a so-called throttle valve, or pressure regulator valve, which provides a torque demand signal pressure proportional to throttle pedal or fuel control position or engine manifold vacuum. The governor signal is employed to upshift the transmission at a particular speed which is increased with increasing torque demand signal in order to obtain proper performance of the power plant.

However, in gas turbine engines, the throttle pedal or other fuel control does not directly control the admission of fuel to the burners. In order to limit the temperature of the gases delivered to the turbines, a control limits the increase in the fuel delivered to the burners on an increase in the fuel control setting to prevent an excessive temperature rise at the turbine. Thus, when acceleration is called for by increasing the setting of the fuel control, a small increase in the fuel supplied is initially provided to increase the temperature of the gas to a predetermined value which increases the speed of the turbine driving the compressor to increase the gas flow, thus permitting further increase in the fuel supply without increasing the temperature at the turbines above a predetermined value. For this reason, an increase in the position of the fuel control is not quickly reflected in an increase of torque or power output of the gas turbine engine. It is, therefore, desirable in gas turbine engines to employ a signal other than fuel control at throttle pedal position to control the pressure regulator valve providing the so-called throttle pressure employed in automatic transmission regulation. During acceleration the throttle pressure signal employed in the transmission should anticipate to a small degree, or at least be simultaneous with, the increase in torque or power output of the engine which is connected to the transmission. If the increase in throttle pressure occurs a significant period of time before the increase in torque output of the engine, it will provide an incorrect signal pressure causing excessive downshifting just prior to an increase of power output of the engine. If the increase in throttle pressure is delayed until after the increase in torque and power output of the engine, a premature upshift may be permitted which might be immediately followed by a downshift on the subsequent rise in throttle pressure. These malfunctions would cause hunting in the transmission shift control system.

In order to avoid these objectionable features where automatic transmissions controlled by a governor speed signal and a torque or power demand signal are employed in conjunction with a gas turbine type power plant, it was found desirable to employ gasifier pressure, the pressure in the gas turbine engine at the compressor outlet and before the burner inlet, which provides a signal indicating the torque or power demand on the engine. This signal occurs slightly before, or at least simultaneously with, the increase in the torque and power output of the engine. Also, in order to obtain smoother shifts in a gas turbine engine automatic transmission power plant, it is desirable to control the main line pressure in accordance with compressor outlet pressure so that the main line pressure employed to engage the ratio clutches increases with increasing torque and power output. When this is done, the line pressure increases with increasing torque output to provide the required force with varying torques to insure smooth shifts.

In a modification it is proposed to continuously supply gasifier pressure to one area of a throttle pressure valve to supply the normal throttle pressure and to supply gasifier pressure to another area of the throttle pressure valve when the throttle is moved to the forced downshift position to actuate the throttle pressure valve o provide a downshift pressure signal.

In power plants having gas turbine engines, having a compressor turbine and a power output turbine, employed in conjunction with transmissions requiring fluid for lubrication or control, both the input and the output will stall when the load is at rest. In order to provide a continuous supply of fluid for the transmission, a compressor shaft driven pump is activated to supply fluid when the transmission output is stalled.

This invention is an improvement over the transmissions shown in Herndon Patent 2,790,327 and the Cheek et al. Patent 2,896,468.

An object of the invention is to provide in a power plant having a gas turbine engine and an automatic transmission, a transmission control pressure proportional to the compressor discharge pressure of the gas turbine engine.

Another object of the invention is to provide in a power plant including a gas turbine engine and a multiratio transmission, a control system to engage the ratio devices with a force proportional to the compressor discharge pressure of the gas turbine engine.

Another object of the invention is to provide in a power plant having a gas turbine engine and an automatic speed responsive multiratio transmission, a signal force proportional to the compressor discharge pressure of the gas turbine engine to modify the speed responsive transmission shifting mechanism.

Another object of the invention is to provide in a power plant, including a gas turbine engine and an automatic transmission having a control system employing a torque demand signal pressure, a torque demand signal pressure regulator valve controlled by gas turbine engine outlet pressure to provide a pressure proportional to the compressor outlet pressure.

Another object of the invention is to provide a power plant having a gas turbine engine and a multiratio transmission having an automatic speed responsive shifting mechanism, a pressure regulator valve controlled by gas turbine compressor outlet pressure providing a signal pressure proportional to compressor outlet pressure to modify the action of the governor on the transmission shofting mechanism and to control the force of engagement of the ratio engaging devices.

Another object of the invention is to provide in a power plant having a gas turbine engine having a com- automatically shifted transmission, a control system having a pressure proportional to gas turbine compressor outlet pressure to modify the automatic ratio change speed responsive mechanism and a fuel control responsive mechanism operative to control compressor outlet pressure to the control system to provide a forced downshift.

Another object of the invention is to provide in a power plant having a gas turbine engine having a compressor turbine and a power output turbine driving a transmission requiring a control or lubrication fluid supply, an auxiliary pump driven by the compressor turbine and effective to supply fluid when the transmission output is stopped.

These and other objects of the invention will be more apparent from the following description of the preferred embodiments of the invention illustrated in the accompanying drawings of which:

FIGURE 1 diagrammatically illustrates a gas turbine and multiratio transmission power plant.

FIGURES 2a and 2b diagrammatically show a hydraulic control system for the power plant of FIGURE 1.

FIGURE 3 diagrammatically shows a modified gas turbine multiratio transmission power plant and the control system therefor.

The power plant shown diagrammatically in FIGURE 1 includes a gas turbine engine and an automatic transmission. The gas turbine engine has an air compressor 1 located in a compressor housing 2 having an inlet 2a and an outlet 2b. The compressor 1 is connected by shaft 1s to the compressor turbine 1t. The compressor 1 delivers air under pressure through the compressor outlet 2b to the duct 3 in which the fuel burner 4 is located. The duct 3 delivers the high temperature gas through the nozzle 5 to drive the compressor turbine 1t. The gas then passes through nozzles 6 to drive the power turbine 6t which drives the output shaft 6s and reduction gear A. The exhaust gases being conducted at atmosphere or to a suitable heat regenerative system by the exhaust duct 7.

The throttle pedal 8 is connected to a fuel control mechanism 9 which is subject to gasifier discharge pressure via line 9g and compressor speed via shaft 9s to connect the fuel supply line 9f to the fuel burner supply pipe 9b to control the supply of fuel to the burner 4. Various conventional fuel control systems may be employed controlling the amount of fuel supplied to the burner in response to the throttle pedal position in accordance with gasifier outlet or discharge pressure and compressor speed and/or the temperature of gases supplied to the turbine in order to prevent overheating. One suitable arrangement for controlling the fuel supplied to the gas turbine engine is shown in application Serial No. 854,688, filed November 23, 1959 by Arthur E. Brown et al.

The throttle pedal 8 is connected to the fuel control through a conventional lost motion lever system consisting of a pair of levers 8a and 8b which are pivoted at 8c to the frame and biased to a fixed relative position by spring 8d as limited by abutments on the levers. Normal throttle movement of pedal 8 is transmitted to control lever 9a of the fuel control device 9. However, when lever 9a reaches the limit of its control movement the throttle pedal 8 may be moved further to the downshift position compressing spring 8d and moving downshift rod 8e further to downshift position. One construction for a lost motion linkage of this type is shown in the Cislo Patent 2,823,555 which issued February 18, 1958.

The compressor shaft 1s is connected by suitable gearing to an auxiliary shaft 1a which drives the fuel control governor shaft 9s and an auxiliary pump 10 which supplies fluid from a sump via inlet line 11 to an outlet line 12 connected to provide an auxiliary fluid supply to the hydraulic control system (FIGURE 2a). The gas turbine output shaft 6s is connected by a suitable reduction gear unit A to the transmission input shaft 13. The gasifier discharge pressure in the compressor outlet 2b is also connected by conduit 21 to control the transmission as explained below.

The input shaft 13 which is driven by the reduction gear unit is integral with the drum 14 having internal gear teeth meshing with planet gears 17 meshed with a sun gear 15 of a front planetary gear unit B. The hollow shaft 13 also drives the rotor of a variable capacity pump 40. The planet gears 17 are supported upon spindles of a carrier 16 fixed on a hollow shaft 20 and having extension carrying clutch plates 90 (FIGURE 2a) of a clutch C which coact with plates 91 carried by drum 15' of sun gear 15 and are disengaged by springs 95. The front planetary unit B is made operative either by application of brake band 18 to drum 15' of sun gear 15, or by engaging the clutch plates 90—91 against a stop 92 by means of a piston 94. The drum 15' has an annular cylinder space for the clutch piston 94 fed by liquid under pressure in a passage 390. The forward end of the hollow shaft 20 is supported in a bearing 23 within the hollow shaft 13 and is splined to shaft 24.

The front planetary gear unit B lies in front of a rear planetary gear unit E, consisting of a sun gear 25 on the shaft 24 meshed with planet gears 28 supported upon spindles of a carrier 27 integral with output or load shaft 30. An internal gear 26 meshing with planet gears 28 is attached to a drum 29' which carries clutch plates 102 of a clutch D mating with plates 101 which are keyed to a drum 100 splined on the rear portion of shaft 20. The drum 29' has a cylinder for an annular piston 105; and a spring 106 serves to disengage plates 101 and 102 when the cylinder is connected to exhaust.

The rear planetary gear unit is made operative either by application of a brake band 29 to drum 29', or by engagement of clutch plates 101 and 102 against a stop 104 by fluid pressure delivered through a passage 310 to the annular piston cylinder.

A reverse planetary gear unit F comprises an extension of the drum 29' carrying a sun gear 32 which meshes with planet gears 35 supported on spindles of a carrier 31 splined to the shaft 30. The planet gears 35 also mesh with an internal gear 34 on a drum which is adapted for axial movement. The drum is integral with a brake cone 156 adapted to be held by a piston 152 of a brake G against a backing cone 150 keyed to the transmission housing. The piston 152 is prevented from rotation by pins 155 in part 151 of the housing and the brake is normally held released by springs 157 between the piston 152 and a ring 158 secured to the part 151. A passage 551 leads to a cylinder in the part 151 for the piston 152.

The brake band servo mechanism 60 for the front planetary gear unit (FIGURE 2a) comprises the brake band 18 having one end fixed and its other movable end engaged by a rod 62 fixed to piston 61 slidable in a lower cylinder. A central web 65 closes the upper end of the lower cylinder and is recessed to receive a piston 66 fixed to the rod 62. The piston 61 can be moved upwardly by fluid pressure applied to the lower cylinder below the piston 61 through a port 64 from a passage 308. A port 67 connects a passage 82 to the recess in the web 65 below the piston 66. The piston 66 is biased downwardly by a spring 70 which is retained by a cap 69 between which and a piston 68 is a spring 73. The piston 68 is slidable on the rod 62 in an upper cylinder which is connected, above the piston, to a passage 72 leading through a port 71 to a passage 391. A passage 74 leads from the port 71 to the lower cylinder above the piston 61.

In neutral, the piston 68 is biased upwardly by the spring 73 and the piston 66, with the rod 62 and piston 61, is biased downwardly by the spring 70. In first ratio, third ratio and reverse drive, fluid pressure in passages 308 and 82 acts below the pistons 61 and 66 to apply the brake band.

In second and fourth ratios, brake release pressure is fed from passage 391 through port 71 to the passages 72 and 74 to apply downward thrust upon the upper faces of pistons 68 and 61. The springs 70 and 73 are compressed and the piston 68 engages the piston 66 fixed to rod 62. The combined effective area of the upper surfaces of pistons 68 and 61 is greater than the area of the undersides of pistons 61 and 66, hence line pressure in passage 391 acts to release the brake band 18.

The rear unit brake band servo mechanism 110 comprises the brake band 29 having one end fixed and the other end engaged by a movable strut and rocker 114 operable by a piston rod 112 and piston 111 which is of two-step form. The larger diameter piston is slidable in the main cylinder and the smaller in one of a pair of cylinders divided by a central web 135. A hollow rod 116 passes through the web 135 and carries a large piston 115 slidable in the other of the pair of cylinders. A passage 130 in the web 135 is partially closed by a blade check valve 131 operable by a plunger 136. This checks exhaust of fluid from the cylinder to the right of the web 135 except when fluid pressure is applied through a passage 356 to the left of plunger 136. The piston 115 is biased leftwardly by springs 124 and 125 held in a cap 120 secured to the servo body, and is guided by telescopic cylinders 121, 119 which divide the space to the right of the piston into inner and outer chambers 118, 122. The passage 117 through the rod 116 connects the chamber 118 to the chamber to the left of the web 135. A spring 134 in this chamber acts between the web 135 and the piston 111 and a light spring 137 separates the piston 111 from the rod 116.

Fluid pressure for releasing the rear unit brake band 29 is admitted from a passage 290 to a port 291 to the left of the piston 111, and through a branch passage to the passage 130 past the check valve 131 to chamber to the right of the web 135. An open port to the left of the piston 115 is connected to a rear unit servo exhaust valve 140 whence a passage 290' leads to the passage 290. The space between the two steps of the piston 111 is connected to exhaust and a passage 650 opens into the main cylinder so as to be in communication with the chamber to the left of the piston 111 when the brake band is fully released.

There is also a rear pump 50 driven from the output shaft 30 which also drives a governor or speed-responsive valve.

The combination of the front, rear and reverse planetary gear units provides for four forward speed ratios and one reverse ratio by actuation of the brakes and clutches, in the following pattern in which "X" indicates actuation.

|  | Front unit | | Rear unit | | Reverse unit, brake C |
|---|---|---|---|---|---|
|  | Brake 18 | Clutch C | Brake 29 | Clutch D |  |
| First | X |  | X |  |  |
| Second |  | X | X |  |  |
| Third | X |  |  | X |  |
| Fourth |  | X |  | X |  |
| Reverse | X |  |  |  | X |

In the first ratio drive as transmitted from the shaft 13 to the internal gear 14 and by the carrier 16 in reduction ratio of the front unit through shaft 20 to shaft 24 to drive the sun gear 25 of the rar unit. Brake 29 of the rear unit is engaged to drive the carrier 27 and output shaft 30 in reduction ratio.

In second ratio, the front clutch C is engaged to lock up the front gear unit B so that the shaft 13 directly drives the shaft 24. Shaft 24 is connected by a rear gear unit with the band 29 engaged and in reduction drive to the output shaft 30.

In third ratio, the front unit is in reduction drive as in first ratio. In the rear unit, clutch D is engaged to connect the shaft 20 directly to the output shaft 30.

In fourth ratio, the front clutch C is engaged to provide a direct drive between input shaft 13 and shaft 20. The rear unit is also in direct drive with clutch D engaged to directly connect shaft 20 to output shaft 30.

In reverse, the reverse clutch G which was disengaged in all forward drives is engaged to hold the internal gear 34 to provide reverse drive in the rear unit F. In the front unit, band 18 is engaged to provide a reduction drive from the input shaft 13 via shaft 24 to sun gear 25.

THE CONTROL SYSTEM

The control system shown in FIGURE 2, for actuating the various brake and clutch servos to select the transmissio ngear ratios includes a manual valve 175, shift valves 220, 235 and 250, a torque or gasifier pressure-responsive or T-V valves 185—190—641, a compensator valve 204, a double transition valve 210, a T-V regulator valve 265, forced downshift timer valve 271, an overrun control valve 75, a fourth-to-third timer valve 85, an over-control valve 377, the rear unit servo exhaust valve 140 and a system exhaust valve 287.

Pump Pressure

The front pump 40 draws oil from the sump through a passage 41 and delivers it under pressure through a passage 44 at a regulated pressure as shown in the Herndon Patent 2,805,628. The pump 40 has a rotor 601 driven by the shaft 13 and having a plurality of vanes 602 biased into contact with the internal surface of the stator 603 which is reciprocally mounted on guide surfaces 604 in the housing 606 to vary the eccentricity of the stator with respect to the rotor to vary the capacity of the pump. The pump outlet pressure is regulated by valve 607 which controls the eccentricity of the stator with respect to the rotor. The pump outlet pressure in the pump outlet port 608 is connected by line 609 to act on the inner end of the valve 607 to urge the valve against the biasing force of spring 611. As more fully explained in the above Herndon patent, the pump outlet pressure enters a bore in valve element 607 which, when the outlet pressure of the pump is above the desired pressure is connected by line 612 to the upper space 613 to urge the stator 603 downwardly to reduce the pump capacity and pressure. If the outlet pressure is less than the regulated pressure value, the valve 607 will move inwardly connecting the outlet pressure to line 614 which is connected to the chamber 616 at the lower side of the stator 603 to urge the stator to greater eccentricity to increase the pump capacity to increase the pressure. A reverse pressure plug 618 and a torque plug 619 are located in a stepped bore 621 to act through a spring on the valve 607. When the transmission is in reverse, pressure supplied by line 552 to the space between the plugs acts on reverse plug 618 to increase the pressure. The torque demand signal line 332 supplies pressure to act on the plug 619 to increase the main line pressure proportionally to the torque demand signal pressure.

Pump 40 delivers oil under pressure through passage 44 to the system exhaust valve 287 past a ball check valve 285 which is disclosed between the passage 44 and the rear pump delivery passage 50'.

The rear pump 50 driven by shaft 30 supplies fluid via line 50' and check valve 285 to main line 44. In addition an auxiliary pump 10 driven by the compressor shaft 15 supplies fluid to main line 44 when pump 50 is stopped, as when a vehicle or other load is at rest. The auxiliary outlet line 12 is connected by valve 626 either to sump line 627 or branch 628 of main line 44. The valve 626 is actuated by solenoid 631 which is energized when pressure responsive switch 632 is closed by rear pump pressure to complete a circuit from battery 633 to raise the valve to connect auxiliary pump outlet line 12 to sump line 627. The battery 633 is connected to ground 634 and the solenoid is connected to ground 636 to provide a complete circuit.

Oil under pressure from the passage 44 is also directed through a passage 300 to the speed-responsive valve or governor 301 and through a branch passage 302 to a parking brake pawl piston 283 to hold the pawl 280 in the released position. A spring 281 normally holds the piston 283 in a position to allow the pawl to engage external teeth on the internal gear 34 of the reverse planetary gear unit F. The front pump may also deliver oil at a lower pressure to passage 42 for lubrication.

*Governor Pressure*

The governor or speed-responsive valve 301, when driven from the output shaft of the vehicle produces two levels of pressure, termed G-1 and G-2 pressures respectively in passages 371 and 384 respectively for exerting force tending to upshift the shift valves 220, 235 and 250. G-1 pressure is also directed through a branch passage 367 to a reverse blocker piston 368 to actuate, against a spring 369, reverse blocker mechanism 370 to prevent engagement of reverse drive.

G-1 pressure passage 371 is connected to a chamber below a governor plug 241 associated with the 2-3 shift valve 235, by a branch passage 376 to a port of the third-to-fourth ratio overcontrol valve 377, by a branch passage 375, to a chamber below a piston 224 on the 1-2 shift valve 220, by a branch passage 374 to a chamber below a governor plug 225 associated with the 1-2 shift valve 220, and by a branch passage 372 to a chamber below the 3-4 shift valve 250.

G-2 pressure passage 384 is connected to a chamber below the overcontrol valve 377 and by a branch passage 385 to a port of the valve 377.

The governor or speed-responsive valve 301 comprises a pair of valves which are alike except for the masses of their weights 366 and 365, and operate as described in the specification of our Letters Patent 2,204,872.

*The System Exhaust Valve*

The system exhaust valve 287 comprises a valve body 288 urged downwardly by a spring 289. There is an exhaust port 600 above the valve, a pair of ports connected to a pressure supply passage 299 and a chamber below the valve connected to the pump pressure passage 44. Pressure in this chamber lifts the valve to connect the passages 44 and 299. Lack of pressure in this chamber permits the valve to fall to connect the passage 299 to exhaust.

The pressure supply passage 299 is connected to a supply port of the compensator valve 204, to one supply port, and through a restricted branch passage 553 to another supply port, of the manual valve 175, through a branch passage 295 with a restricted orifice 296 to a supply port of the 1-2 shift valve 220, and by a further branch passage 495 with a restricted orifice 496 to supply groove 497 of a regulator plug 245 associated with the 2-3 shift valve 235. A passage 498 leads from the groove to a ball valve 499 which prevents escape of oil from this passage.

*The Manual Valve*

The manual valve 175 can be set in any of five positions, "N" Neutral, "DR4" Drive Range Four, "DR3" Drive Range Three, "LO" Low, and "Rev" Reverse, by a control linkage (not shown) from a selector lever on the steering column leading to a pin 180 between external collars 179. The valve has three lands 176, 177 and 178 and eleven ports, which from top to bottom are as follows: an exhaust port; a port communicating by the passage 310 with the control chamber of the rear unit clutch D, by a branch passage 311 with a blade check valve 314 and by a branch passage 312 with a port of the forced downshift timer valve 271; a port communicating with the passage 290 leading to the brake release chambers of the rear unit brake band servo mechanism 110 and to a port of the rear unit servo exhaust valve 140, by a branch passage 292 to a chamber below the double transition valve 210, and by a branch passage 294 with a chamber below the 1-2 shift valve 220; the pressure supply ports each communicating with the pressure supply passage 299; two ports on opposite sides, one port for directing line pressure to port 325 of the T-V valve 190 and to a port 326 of a plug 200 associated with the compensator valve 204, the other port connected to a passage 305 leading to above the fourth-to-third timer valve 85, through a restricted orifice 306 to a passage 307 connected, by the passage 308 leading from above the valve 85 to the port 64 of the front unit brake band servo mechanism 60, through a branch passage 308′ to below the overrun control valve 75 and through a branch passage 309 to a port of the valve 75, and through a branch passage 400 and restricted orifice 415 to a supply port of the 3-4 shift valve 250, and through a branch passage 401 and restricted orifice 402 to a supply port of the 2-3 shift valve 235; a port connected by a passage 430 to branch passages 431 and 432 leading to a control chamber of a shuttle valve 260 and to control chamber of a governor plug 254 of the 3-4 shift valve 250; a port connected by a passage 460 to branch passages 461 and 462 leading to a chamber above an auxiliary governor plug 238 of the 2-3 shift valve 235 and to a port of the overcontrol valve 377; a port 550 connected by the passage 551 to the control chamber of the piston 152 of the servo mechanism of the reverse brake G and by a branch passage 552 to a port below the compensator valve 204 and to a pressure control plug for the variable capacity front pump; and an exhaust port.

With the manual valve in the DR4 position, as shown, land 176 clocks off the upper exhaust port. Line pressure from passage 299 is admitted to front brake band supply passage 305 and passage 308 by way of the ports between lands 177 and 178. Line pressure is also admitted to the T-V valve 190 and the compensator plug 200. Passages 430, 460 and 551 below the land 178 are exhausted to sump, and passages 310 and 290 are connected between lands 176 and 177.

With the manual valve 18 in the DR3 position, the pressure distribution action is similar to that just described with the exception that line pressure from passage 299 is also admitted to passage 430. Passages 460 and 551 remain exhausted to sump.

With the manual valve 18 in LO position, line pressure from passage 299 is also admitted to passage 460.

With the manual valve in REV position, land 178 blocks off the lower exhaust port and line pressure is admitted from passage 299 to passages 305, 430 and 460 and to reverse brake apply passage 551 between the lands 117 and 177. Pressure is also admitted to passage 290 from passage 553 between the lands 176 and 177 and passage 310 is exhausted through the upper exhaust port.

With the manual valve 18 in N position, land 178 blocks off passage 299 from passages 305, 430, 460 and 551 which are connected to the lower exhaust port. Pressure is admitted to passage 290 between lands 177 and 178 and passage 310 is exhausted through the upper exhaust port.

*The T-V Valve*

The T-V valve is formed of two sections 185 and 190 slidable in a bore. The bore at the end adjacent valve section 185 has a closure 186 sealing the end of the bore and having the gasifier pressure line 21 extending through it. A spring 187 normally biases the valve plug 185 into engagement with the valve section 190. Gasifier pressure supplied by line 21 increases the biasing force on valve section 185 to act on the regulator valve section 190 to increase regulated T-V pressure with increasing gasifier pressure. Section 190 includes a pair of lands 191 and 192, and a land 194 of less diameter. A detent plug 196 is disposed above the section 190. The valve bore has ten ports as follows: a port connects the upper end of the detent plug 196 to T-V pressure delivery passage 330 through a restricted passage 334; a port 338 exhausts to sump; a port 337 connects the T-V pressure delivery passage 330 to the valve bore adjacent land 194; a restricted port 336 connects the T-V pressure delivery passage 330 to the space between land 194 and 192; a port with which the land 192 co-acts to meter pressure from port 325 to delivery passage 330; port 325 connects to the manual valve port; a port between the sections 185 and 190 which exhausts to sump.

As the gasifier pressure increases this gas pressure acting on valve section 185 increases the biasing force on valve section 190. A variable fluid pressure termed T-V pressure is metered by land 192 proportional to gasifier or compressor outlet pressure and reacts on land 192 and detent plug 196 forcing section 190 down against section 185 against the biasing force so that land 192 restricts the fluid delivered to passage 330. The delivery passage 330 is also connected through the passage 334 to a chamber above the compensator valve 204, through a branch passage 332 to a pressure regulator plug for the variable capacity front pump, and through a branch passage 331 to a chamber below the T-V regulator valve 265.

Downshift Valve

When the throttle pedal 8 is moved to the downshift position the rod 8e acts on downshift valve 641 to move the valve from the normal position shown connecting downshift line 416 to exhaust 642 and blocking supply line branch 643 of line 400 to the downshift position connecting line 400 via branch 643, valve 641 to downshift line 416. During the normal range of throttle movement, valve 641 remains in the position shown.

The Compensator Valve

The compensator valve 204 supplies a metered pressure, termed compensator pressure, to a delivery passage 355 as determined by the degree of fluid pressure delivered to T-V.

The compensator valve 204 is slidable in a valve bore, and has a pair of lands 206 and 208, and a regulator plug 200 which has lands 201 and 202 of different diameters and abuts against a pin 203 below the plug and carries a spring 207 between the compensator valve and the plug. The valve has seven ports as follows: a port which admits T-V pressure to above the compensator valve to urge the compensator valve toward the regulator plug 200 against the spring 207; an exhaust port 358; a port which admits compensator pressure to the passage 355, which is connected to the passage 356 and by a branch passage 357 to below the plug 200; a port with which land 208 co-acts to meter main line pressure from supply passage 299; a port which connects the reverse brake apply passage 552 to between the plug and valve; the port 326 between the lands of the plug; and a port which communicates with the passage 357 to admit compensator pressure to below the compensator plug 200.

The compensator valve supplies a metered pressure, termed compensator pressure, to a delivery passage 355 as determined by the level of fluid pressure delivered to the T-V pressure delivery passage 330. This metered compensator pressure is delivered by passage 357 to a chamber between compensator regulator plug 200 and the double transition valve 210, through a passage 359 to a port of the over-run control valve 75, and through the passage 356 to the rear unit brake band servo mechanism 110. This metered compensator pressure, which increases when T-V pressure in passage 330 increases, acts to assist in the application of the rear brake band to prevent slip as high torque is being transmitted. Line pressure, admitted to the passage 552 when the manual valve is in REV position, moves the compensator valve upwards to block off the passage 229 and exhaust the compensator pressure in passage 355 to port 358.

The Double Transition Valve

The double transition valve 210 is shown in its first-and-second ratio position and can be moved upwards to a third-and-fourth ratio position. The valve 210 has a land 214, a pair of lands 211 and 212 of smaller diameter a land 215 of larger diameter. There are five ports as follows: a port connected to a passage 410 leading to a port of the 3–4 shift valve 250; a port which communicates by the passage 390 with the control chamber of the piston 94 of the front clutch C, through a passage 391 with the port 71 of the front unit brake band servo mechanism 60, through a passage 392 to above the overrun control valve 75, and through a passage 450 to below the timer valve 271; a port connected to a passage 297 leading to a port of the 1–2 shift valve 220 and through a passage 298 to one end of the rear unit servo exhaust valve 140; a port between the lands 214 and 215 connected by passages 360, 361 and 362 to above the 2–3 shift valve 235; and a port below the valve 210 connected to the passage 292.

In the first-and-second position, as shown, the valve connects pasages 390 and 297 between lands 211 and 212. In the third-and-fourth position, the valve connects passages 390 and 400.

The T-V Regulator Valve

The T-V regulator valve 265 consists of two lands 266 and 267, the valve oeing biased downwards by a spring 268 to the position shown wherein the valve cuts off T-V pressure supplied to below the valve by way of passage 331. The valve has four ports as follows: a port with which the land 266 co-acts to meter pressure to a passage 340; a port between the lands 266 and 267 connected to passage 340; a port 344 connected to the passage 340 and to an annular recess 341 surrounding the regulator plug 245, through a passage 346 to a port 347 of a regulator plug 230 of the 1–2 shift valve 220, through a passage 346 to a port 347 of a regulator plug 230 of the 1–2 shift valve 220, through a passage 349 to above a regulator plug 257 of the 3–4 shift valve 250, through a restricted passage 342 to a port 343 above the 2–3 shift valve 235 and an exhaust port 345.

The port 344 is uncovered when the T-V pressure below the valve is below a predetermined value to exhaust passage 340, and the other ports are covered. When T-V pressure rises above this value, the valve 265 is forced upwards against the spring 268 and meters pressure to the passage 340. This variable fluid pressure, termed regulated T-V pressure, is applied above the land 266 to assist spring 268 to move the valve downwards to cut off the pressure and open port 344.

The 1–2 Shift Valve Assembly

The assembly comprises the 1–2 shift valve 220, the regulator plug 230 and the governor plug 225. The shift valve 220 is made up of the piston 224 and a pair of lands 221 and 222. A spring 234 biases the valve 220 downwards to its first gear ratio position as shown and the governor plug 225 transmits G–1 pressure tending to shift the valve 220 upwards. The regulator plug 230 carries the other end of spring 234 and has two lands 231 and 232 of different diameters. A port above the regulator plug exhausts to sump. The port 347 admits regulated T-V pressure from the passage 346 to between the lands 231 and 232, tending to move the plug downwards against spring 234. A port, controlled by land 231, is connected by a passage 348 to a chamber above the valve piston 224. A port 497 surrounding the plug exhausts to sump.

When regulated T-V pressure is sufficiently great, the plug 230 is moved downwards against spring 234 to admit pressure from passage 346 to the passage 348. The regulator plug 230 acts as a limit valve to limit the pressure in this passage. The land 231 meters pressure to the passage 348, the metered pressure acting in conjunction with spring 234 on the plug to close passage 348 from passage 346 and to open it to the exhaust port 497. Thus the pressure in chamber above the piston 224, termed modulated T-V pressure, is less than the regulated T-V pressure in passage 346 by reason of the action of spring 234.

The valve 220 has three ports as follows: port connected to supply passage 295; a port connected to passage 297; and a port connected by passage 316 to similar ports in the bores of the 2–3 and 3–4 shift valve connected to an exhaust port 317.

The governor plug 225 has a large diameter land 226, subject to G–1 pressure from passage 374 in the chamber below the plug and through passage 510 to such pressure as exists in passage 416 in the chamber above the plug. When downshift valve 641 is moved to the forced downshift position, line pressure is admitted to passage 416 and thus to the chamber above the plug to move the governor plug downward. This eliminates the effect of the governor plug 225 in holding the shift valve 220 in its second gear ratio position.

*The 2–3 Shift Valve Assembly*

The assembly comprises the 2–3 shift valve 235, the regulator plug 245 and two governor plugs 238, 241.

Governor plug 238 has a large diameter land 240 which is subject to governor pressure from below from passage 387, and to opposing line pressure from above from pressure 461 when the manual valve is in the LO position. The governor plug 241 is smaller and is subject to G–1 pressure from passage 371, admitted below the plug. There is an exhaust port above the plug. The governor plugs tend to shift the valve upwards except when pressure is applied in passage 461.

At the opposite end of the shift valve 235 is the regulator plug 245 with a spring 246 interposed. The plug has a port above the regulator plug connected to the passage 440; the annular recess 341 connected to the passage 346; and an annular recess which connects the passages 495 and 498. The plug has two positions, an upper one, as shown, and a lower one in contact with the shift valve 235. When forced downshift pressure is applied to passage 416 by the valve, 641, the plug can move to its lower position.

The valve 235 has eight ports as follows: a narrow upper port connected to the passage 362 by a passage to a lower wide port; a port 343 connecting the chamber above the valve to the passage 342; the wide port; an exhaust port 353; the port connected through the restricted orifice 402 to the passage 401; a port connected by a passage 315 to a port of the forced downshift timer valve 271 and by a passage 320 to the blade check valve 314; and ports connected to exhaust 317.

The valve has two lands 236 and 237 and the land 237 has a pair of annular recesses. In the lower position of the valve, as shown, the chamber above the valve is connected to port 343, the wide port and the exhaust port 353 and the passage 401 are closed by land 237 and the passage 315 is connected to exhaust through passage 316 between lands 237 and 236. In the upper position of the valve, the chamber is connected to exhaust port 353 through the wide port and an annular recess in the land 237, port 343 is closed by land 237, passage 401 is connected to passage 315 between the lands 236 and 237 and the exhaust passage 316 is closed. This exhaust connection to port 353 has the result of decreasing the pressure in the chamber above the valve after the shift valve has moved to its third gear ratio position so that the shift valve remains in its third gear ratio position until a lower vehicle speed is reached compared with that required to cause the shift valve to shift to its third gear ratio position in the first instance.

*The 3–4 Shift Valve Assembly*

The 3–4 shift valve assembly comprises the regulator plug 257, the shuttle valve 260, the shift valve 250, and the governor plug 254. A spring 258 biases the shift valve 250 toward its lower or third gear ratio position as shown. A stem on the valve 250 contacts the regulator plug 257 when the shift valve is moved upwards to its fourth gear ratio position. Regulated T-V pressure from the passage 349 is directed to the chamber above the regulator plug 257, tending to move the plug toward the shift valve 250 to uncover a port 350 and to admit regulated T-V pressure to the chamber above the valve 250. Forced downshift pressure can be admitted through passage 416 to above the shuttle valve 260 to force the latter downwards. This connects the passage 416 to a port 417, passage 419 and port 418 of the shuttle valve, which latter port is connected to port 423 of the regulator plug 257. In the fourth gear ratio position, the port 423 is connected by an aperture 421 to the chamber above the shift valve 250. When valve 641 is not in forced downshift position and the shift valve is in its fourth gear ratio position, the chamber above the shift valve is connected to exhaust through aperture 421, port 423, port 418 and either passages 431 and 430 or passage 419 and 416 depending on the position of shuttle valve 260. In DR3 and LO positions, the manual valve directs pressure to the passage 430 to lift the shuttle valve 260 to admit pressure to ports 418 and 423 so as to move the shift valve downwards if it is in its fourth gear ratio position.

The shift valve 250 has a pair of lands 251 and 252, and an extension which contacts the governor plug 254. Passage 410 is connected to exhaust port 317 between the lands when the shift valve is in its third gear ratio position (as shown). When the shift valve is in its fourth gear ratio position, land 251 blocks off exhaust port 317 and passages 410 and 415 are connected between the lands. G–1 pressure from passage 372 is admitted to the chamber below the land 251 of shift valve. Governor pressure from the outlet port of the over-control valve 377 is admitted to the chamber below the governor plug 254 by way of passage 386, tending to upshift the shift valve 250. The governor plug 254 has two lands 255 and 256 of different diameters, and passage 432 admits to between the lands. The chamber above land 255 is exhausted.

*The Overcontrol Valve*

The overcontrol valve 377 is biased downwardly by a spring 380. The valve has three lands 464, 379 and 381 and five ports as follows: a port connected to passage 384 and to a chamber below land 381; a port connected to passage 385 and normally opening between the lands; a port connected to passage 386 and to between the lands; a port connected to passage 376 and normally blocked off by land 379; and a port connected to passage 462 and to between land 379 and larger land 464. Normally the valve admits G–2 pressure from passage 385 to passage 386 between the lands 379 and 381, and to below the valve, tending to lift it.

At a relatively high vehicle speed, for instance 75 miles per hour, G–2 pressure in the chamber below the valve overcomes spring 380 to move the valve 377 upwardly to connect passages 376 and 386 and to block off passage 385 by land 381. In this position, G–1 pressure from passage 376 is admitted to the chamber below the governor plug 254 to cause the shift valve 250 to upshift to its fourth gear ratio position even though the manual valve 175 may be in DR3 position. The governor pressure existing in passage 376 is greater than that in passage 384, and this greater pressure acts upon the governor plug 254 at such relatively high vehicle speed to upshift the shift valve irrespective of the effect of pressure in the chamber above the valve or in the chamber above the land 256 and the effect of spring 258.

Similarly, with the manual valve in LO position, line pressure is applied through the passages 460 and 462 to below the land 464 to assist G–2 pressure in lifting the over-control valve 377. At a relatively high vehicle speed in second gear ratio, for instance 45 miles per hour, G–2 pressure in the chamber below the valve and line pressure below the land 464 overcome the spring 380 to move the valve upwardly to direct G–1 pressure from passage 376 to passage 386 instead of G–2 pressure from passage 385. G-1 pressure in passage 376 is admitted through branch passage 387 to the chamber below the auxiliary governor plug 238 associated with the 2-3 shift valve 235. The increased pressure in this chamber causes upshift of the valve 235 irrespective of the effect of pressure in the chambers above the valve and auxiliary governor plug and the effect of the spring 246.

This protects the vehicle engine against unintentional overspeed operation in third and second gear ratios. It may happen that when the manual valve is in DR3 or LO position the vehicle may be driven down a long hill or in open country such that high speeds may be easily maintained. The driver may not be conscious of the fact that the transmission is still in third or second gear ratio with the valve in DR3 or LO position and, in the absence of a protective device, damage to the engine may result through prolonged operation in third or second gear ratio at high vehicle speeds. The valve 377 causes an upshift to fourth or third gear ratio and thereby prevents excessive engine speed under such conditions.

*The Over-Run Control Valve*

The over-run control valve 75 has an upper land 77, a divided low land 78 and four ports as follows: a port controlled by land 78 leading to passage 359; a port between the lands and connected by passage 82 to port 67 of the front unit brake band servo mechanism; a port controlled by land 77 and connected to passage 309; and a port above the valve connected to passage 392. The valve is biased downwardly by a spring 79 held in a closure cap 80 which is secured by a pin 81.

To apply the brake band to the front unit by means of servo 60, line pressure is admitted to the chamber beneath piston 61 by way of passage 308 and to below the over-run control valve 75 through passage 308' to lift the valve against its spring to admit line pressure from passage 309 through passage 82 to the chamber below the piston 66 to move the pistons and rod outwardly against springs 70 and 73 and to apply the brake band. At this time the chambers above the pistons 61 and 66 are exhausted.

For second and fourth gear ratios, the front unit is in direct drive and line pressure is admitted to passage 390 and thence to the control chamber of the piston 94 of the clutch C and through the passage 391 to the chambers above the pistons 61 and 68 to depress the pistons and rod to release the brake band. The pressure from passage 391 is also admitted through passage 392 to the port above the land 77 of the valve 75 to depress the latter against the pressure in the chamber below the valve, whereupon land 77 closes passage 309, and the chamber below piston 66 is connected to the passage 359 by way of passage 82 and between lands 77 and 78. The compensator pressure is applied to resist release of the front unit brake band and to time the release in accordance with throttle valve opening.

*The Fourth-to-Third Timer Valve*

The fourth-to-third timer valve 85 is made up of a land 88 and a land 87 of larger diameter. The passage 305 leads to the upper part of the bore of the valve and from the other side leads the passage 308. With the valve raised, the passage 305 has no access to above the land 88, but the passage 308 communicates with a groove 88' which extends above part of the land. The passage 650 is connected to a chamber below the valve and there is an exhaust port 89 between the lands 87 and 88. In first and second gear ratios, the rear unit brake band is applied so that the passage 650 exhausted to the right of piston 111. The valve 85 is thus depressed to connect the passages 305 and 308. During a shift from second to third gear ratio, the piston 111 moves to the right and at the end of the shift, with the rear brake band released, the passage 650 is connected to the passage 290 to the left of the piston 111. Pressure in this passage lifts the valve 85 to close the passage 308 from the passage 305 except through the passage 307 and restricted orifice 306. The valve 85 is effective when shifting from fourth to third gear ratio to place the restricted orifice 306 between the passages 305 and 308. This delays the application of the brake band 18 by the servo 60, momentarily permitting the engine to speed up, due to the fact that the front unit is ineffective to transmit torque, upon release of the front unit clutch C, until the brake band 18 is applied. The valve therefore functions to permit high torques to be delivered quickly by the engine upon a downshift from fourth to third gear ratio.

*The Rear Servo Exhaust Valve*

The rear servo exhaust valve 140 has two lands 141 separated by a groove 142 of greater size than the orifice 132 in valve 131 and is spring biased by a spring 144 as shown to insert the groove 142 in the passage 290' which leads from the left of the piston 115 to the passage 290. When there is no pressure in the passage 298, that is in reverse and first gear ratios, the spring 144 is effective to move the valve 140 to the position shown. This permits a rapid exhaust of fluid pressure from chamber to the left of the piston 115 so that the brake band is quickly engaged by the springs during a shift from reverse to first gear ratio. By means of the valve, it is possible to rock the car out of a rut by quickly moving the manual valve between its REV position and its LO position. In the absence of the valve 140, the time required to exhaust pressure from the chamber to the left of the piston 115 through the orifice 132 would be such that the momentum of the car would be dissipated before the brake band could engage and thus it would be impossible to rock the car.

In second, third and fourth gear ratios, pressure is applied to passage 298 from passages 297 and 295 to move the valve 140 against the spring to block off the groove 142.

*The Forced Downshift Timer Valve*

The forced downshift timer valve 271 is adapted to delay the application of the rear unit brake band until the front clutch is applied during a forced downshift from third to second gear ratio. In third gear, the front clutch is released and the front brake applied for reduction drive and the rear brake is released and the rear clutch applied for direct drive. In second, the front brake is released and the front clutch engaged for direct drive and the rear clutch is released and the rear brake applied for reduction drive. The timer valve 271 comprises a pair of lands 272 and 274 and is biased upwards by a spring 275 bearing upon a cap 276 held in place by a pin 277. A chamber below the valve is connected to passage 450, and one port opens between the lands and is connected to passage 315 from the 2-3 shift valve 235 and to the passage 320 leading to the blade check valve 314, which comprises a spring blade 319 having a restricted orifice 318 between the passage 320 and the passage 311; the other port is connected by the passage 312 to the passage 311 and is controlled by land 272; and a chamber above the valve is connected to passage 441. Pressure in passage 441 moves the valve downwards to block off the ports. Normally the valve connects the ports between the lands 272 and 274.

For third gear ratio, pressure is admitted from passage 401 to passage 315 between the lands 236 and 237 of the shift valve 235, passing between the lands 272 and 274 to the unrestricted passages 312 and 311. This pressure is effective to apply the rear unit clutch D. For second gear ratio, the rear clutch is released by exhausting the passage 310 through unrestricted passages 311 and 312, between lands 272 and 274, through passage 315, between lands 236 and 237 to the passage 316 leading to the exhaust port 317.

To establish a forced downshift from third to second gear ratio, the valve 641 is moved to admit line pressure from line 400 to passage 416. Pressure in this passage acts in chamber above the regulator plug 245 and is also admitted to the chamber above the timer valve 271 to force it downwards against spring 275 to block off passage 312. When downshift occurs the plug 245 and shift valve 235 move downwards under the pressure and the shift valve connects passage 315 to exhaust. All fluid exhausted from the rear brake servo and clutch through passage 315 must pass through the restricted orifice 318 to reach the exhaust port 317. This delays the rate at which fluid pressure is exhausted from the rear unit servos. Pressure in passages 357 and 361 moves the double transition valve 210 downwards to supply pressure to the control chamber of the piston 94 of the front unit clutch C from passage 295, between lands 221 and 222 of the 1-2 shift valve 220, passage 297, between lands 211 and 212 of the double transition valve and passage 390. Pressure in the latter is applied through passage 450 to below the timer valve 271. As the pressure builds up in the front unit clutch control chamber, this pressure acting on the timer valve 271 together with spring 275 moves the timer valve to connect passages 315 and 312, whereupon an unrestricted discharge of fluid from the rear unit servo is thereafter directed to the exhaust port 317 of the shift valve 250. Thus the timer valve 271 delays the application of the rear unit brake band 29 and release of the rear unit clutch D until the front unit clutch C is fully applied and the front unit brake band 18 released and thereafter is moved by front clutch pressure to give an unrestricted discharge of pressure fluid from the rear servo to permit engagement of the rear unit brake band by the springs.

OPERATION

When the car is stationary and the engine stopped, there is no pump pressure. The front unit brake band 18 and clutch C, the rear unit clutch D and the reverse unit brake G are released, but the rear unit brake band servo mechanism springs apply the brake band 29 to the drum 29' to hold the rear unit in reduction.

At the same time, the spring 281 holds the parking pawl piston 283 away from the pawl 280 which engages teeth on the internal gear 34 of the reverse unit F to lock the transmission.

Neutral

When the manual valve is in this position and the engine is started, torque is transmitted from the engine to the shaft 13 and internal gear 14. The pump 10 and 40 delivers oil under pressure through the passage 44 to lift the exhaust valve 287 to connect the passages 299 and 44. Pump line pressure from passage 299 is directed by the manual valve 175 to the passage 290. This pressure, acting on piston 111 and, through passage 130, on piston 115, operates the rear unit servo mechanism to release the brake band 29; and through the passage 292 shifts the double transition valve 210 upwards.

Rear unit clutch apply passage 310 is exhausted through the manual valve, front unit clutch apply passage 390 is exhausted between the lands of the double transition valve, through passage 410, between the lands of the 3-4 shift valve to exhaust port 317, front unit brake apply passage 308 is exhausted through the passage 305 and the manual valve and the reverse unit brake apply passage 551 is exhausted through the manual valve.

As the sun gear 15 of the front unit is free to rotate, no torque is transmitted through the front unit. The other units are also free to rotate without transmitting torque, so that the vehicle remains stationary.

Oil under pressure is delivered through the passages 300 and 302 to the parking brake pawl piston 283 to hold the parking pawl 280 in released position, and to the stationary governor 301 through the passage 300.

Drive Range Four

With the engine idling and the manual valve in the DR4 position, the rear unit clutch apply passage 310 and the rear unit brake release passage 290 are exhausted through passages 311, 312, 316 and 317 and oil under pressure is also delivered through the passage 292 below the 1-2 shift valve 220 to lift the shift valve into the second gear ratio position, compressing the spring 234 against the plug 230. With the 1-2 shift valve 220 in this position, oil under pressure from the passage 44 passes through passage 295, between the lands 222 and 221 into the passage 297 which is closed by the land 212 of the double transition valve 210. Oil under pressure in passage 297 is also admitted to branch passage 298 and acts on the rear servo exhaust valve 140 to move the valve and close the groove 142. The passages 495 and 498 leading from the passage 295 are also filled with oil under pressure, but the ball valve 499 closes the passages. The passage 299 also admits oil under pressure to the compensator valve 204 but is closed by the land 208. The rear unit brake band 29 is applied and the rear unit is in reduction.

Pressure is released from the chamber below the double transition valve 210 through the passage 292 and from below the 1-2 shift valve 220 to allow the latter to downshift to first gear ratio position. This exhausts the passage 297 between the lands 221 and 222 and through passage 316 to the exhaust port 317. Passage 298 is also exhausted allowing the rear unit servo exhaust valve 140 to move to open the groove 142. Pressure previously in passage 297 acts on the land 215 of the double transition valve to lower it and the front unit clutch apply passage 390, front unit brake release passage 391 and passage 450 are exhausted between lands 211 and 212 to the passage 297.

Line pressure from passage 44 is admitted through passage 305 to above the timer valve 85 to depress it as the passage 650 is exhausted. Pressure is thus admitted to passages 308, 308' and 309, to raise the piston 61, rod 62 and piston 66 against the springs 70 and 73, to raise the valve 75 and thus to admit pressure from passage 309 to passage 82 and to below the piston 66. The front unit brake band 18 is applied and the front unit is in reduction.

Pressure is also admitted through the passages 400 and 401 to the 2-3 and 3-4 shift valves 235 and 250, but is blocked by lands 237 and 252. Pressure is also admitted to port 325 of the T-V valve and port 326 of the compensator plug 200, but cannot enter the metering port of the T-V valve as the engine is idling with the accelerator pedal released. The plug 200 is depressed to engage the pin 203. Although the transmission has both front and rear units engaged in reduction, as the engine is idling, the power delivered to the power turbine 6t is insufficient to drive the load or vehicle.

First Gear Ratio

As the accelerator of the vehicle is depressed, the power turbine 6t will provide drive, the front unit B being in reduction with the clutch C disengaged and the brake band 18 applied. The front unit drives shaft 24 and the sun gear 25 of the rear unit E and, as the internal gear 26 is braked by the brake band 29, the planet gears 28 and the carrier 27 rotate with the output shaft 30 in reduction drive.

As the throttle is opened, valve section 185 is moved upwardly with the valve section 190. The T-V valve acts as a metering valve to give T-V pressure in the passage 330 in proportion to the gasifier pressure.

Pressure in passage 330 is admitted through the passage 332 to a control plug of the pump 40 to vary the capacity of the pump and through the passage 334 to above the detent plug 196 and the compensator valve 204, moving these downwardly. Movement of the compensator valve 204 downwards against the spring 207 enables the valve 204 to meter pressure from the passage 299 to the passage 355. Pressure in this passage is admitted through passage 356 to the rear unit brake hydraulic servo mechanism to assist the springs in applying the brake band 29 to the drum 29', through passage 359 to the over-run control valve 75, and through passage 357 to below the plug 200 to lift the latter to assist in metering pressure from passage 299. The pressure in passage 357 also assists in depressing the double transition valve 210. Compensator pressure varies in accordance with throttle position.

T-V pressure is also admitted to the T-V regulator valve 265 to lift the latter to uncover one end of the passage 340 to apply regulated T-V pressure to the regulator plugs 230 and 257 of the shift valves 220 and 250 and to the shift valve 235 to assist in holding the valves in their lower positions. Regulated T-V pressure is also admitted from the chamber above shift valve 235 to passages 362, 361 and 360 and to above the land 215 of the double transition valve to assist in holding the latter down. As drive through the transmission commences, the vehicle moves off and rotation of the output shaft 30 operates the governor 301 and rear pump 50.

G–1 pressure is directed through passage 367 to the piston 368 to prevent engagement of reverse by the manual valve at a vehicle speed above ten miles per hour. G–1 pressure is also directed through passages 371, 374 and 375 to below the governor plugs 225 and 241 of the shift valves 220 and 235 and to below shift valves 250 and 220 to urge the shift valves upwardly.

G–2 pressure is directed through passages 384 and 385, between the lands 379 and 381 of the overcontrol valve 377 and passages 386 and 387 to below governor plugs 238 and 254 of the shift valves 235 and 250 to assist G–1 pressure.

The transmission continues in first gear ratio until the 1–2 shift valve 220 is moved upwards by increased governor pressure due to increased speed. Movement of each of the shift valves upwards by governor pressure is opposed both by springs and by regulated T-V pressure. As the latter is controlled in accordance with throttle opening, higher governor pressures are required to shift the shift valves as the throttle is opened, so that the shift points for each gear ratio vary over a fairly wide range of vehicle speed.

*Shift First to Second*

When G–1 pressure, applied to the governor plug 225 and the shift valve 220, is high enough to overcome spring resistance and regulated T-V pressure, the 1–2 shift valve 220 moves upwardly, closing passage 297 from passage 316 and connecting it to the passage 295. Pressure in passage 295 is thus applied to the passage 297 and through the double transition valve 210 to the passage 390 leading to the control chamber of the piston 94 of the front unit clutch C, through the passages 391 and 392 to the top of the over-run control valve 75 to assist the spring 79 to force the valve downwardly against pressure in the passage 308, and through passages 391, 72 and 74 to above the pistons 61 and 68 of the front unit brake band servo mechanism 60. The depression of valve 75, causes compensator pressure from passage 359 to be applied through passage 82 to below the piston 66 in place of line pressure from passage 309, so that the release of the front brake band 18 is timed in accordance with throttle opening. Pressure in passage 390 is also admitted through passage 450 to below the timer valve 271 to assist the spring 275. Pressure in passage 297 is also admitted to passage 298 to force the rear unit servo exhaust valve 140 to the right to block the groove 142.

The clutch C is engaged and the brake band 18 released so that the front planetary gear unit B is in direct drive. The rear unit E remains in reduction drive.

In moving upwards, the shift valve 220 moves the regulator plug 230 upwards to exhaust the chamber above the valve piston 224. Regulated T-V pressure thus continues to be applied to the valve only on the relatively small differential area between the two lands of the regulator plug 230.

*Shift Second to Third*

When G–1 pressure applied to the governor plug 241 and G–2 pressure applied to the auxiliary governor plug 238 are sufficiently high to overcome the spring and regulated T-V pressure acting on the 2–3 shift valve 235, this shift valve moves upwards, closing the exhaust passage 316 and connecting the passage 401 to the rear clutch apply passage 315. Pressure in passage 401 is thus applied to passage 315 and through the timer valve 271 to the passages 312, 311 and 310. Part of the oil can also pass through the passage 320 opening the valve 319 to the passage 311. Pressure in the passage 310 is applied to the piston 105 of the rear unit clutch D and through the manual valve 175 to the passage 290 to the left of the pistons 111 and 115 of the rear servo. As the clutch apply and brake release passages are connected, the full engagement of the clutch D and the release of the brake band 29 are co-related, but as the pressure in the rear servo is opposed by compensator pressure which varies with throttle opening, the release of the band 29 is delayed relative to the engagement of the clutch D as the torque is increased so that there is no loss of torque or engine runaway.

Pressure in passage 290 is applied through the branch passage 292 to below the double transition valve 210 to move the latter upwards to cut off the passage 390 from the passage 297 and to connect it to the passage 410. As the latter is connected to the exhaust port 317 through the 3–4 shift valve, the passages 392, 391 and 450 are exhausted through the passage 390. The valve 75 is moved up by pressure in passage 308' against the spring 79 to admit line pressure to below the piston 66 from the passage 309. The chambers above the pistons 68 and 61 of the servo mechanism 60 are also exhausted as is the chamber for the piston 94 of the front unit clutch C. Pressure in the chambers below the pistons 66 and 61 applies the brake band 18 to the drum 18' as the clutch C is disengaged. Thus a transition from direct drive to reduction drive is obtained in the front unit.

In moving upwards, the 2–3 shift valve 235 closes off the port 343 so that regulated T-V pressure no longer acts on top of the valve nor in the passages 360, 361 and 362 on top of the land 215 of the double transition valve 210. These passages are exhausted through exhaust port 353.

Pressure in the passage 292 is also applied through the branch passage 294 to below the 1–2 shift valve 220 to ensure that the latter remains in its second gear ratio position while the 2–3 shift valve 235 is in its third gear ratio position.

When the piston 111 of the rear unit brake band servo mechanism 110 reaches its right hand position, with the brake band 29 released, the passage 650 is uncovered and connected to the passage 291 to the left of the piston 111. Pressure in the passage 650 lifts the valve 85, due to the differential size of the lands 87 and 88, and closes the passage 305 from direct communication with the passage 308. As the front unit brake band 18 will have already been applied by pressure through the passages 305 and 308, no immediate effect results from the lifting of the valve 85.

*Shift Third to Fourth*

When G–1 pressure applied to the 3–4 shift valve 250 and G–2 pressure applied to the governor plug 254 are sufficiently high to move the shift valve upwards against spring resistance and regulated T-V pressure acting on the valve, the passage 410 is cut off from exhaust port 317 and connected to passage 415. Pressure in passage 415 is thus applied through the passage 410 and the double transition valve 210 to the passage 390 leading to the control chamber of the piston 94 of the front unit clutch C. Pressure in passages 391 and 392 releases the front unit brake band 18 and depresses the valve 75 to apply compensator pressure below piston 66 as described above under "Shift First to Second." This establishes direct drive in the front unit, the rear unit remaining in direct drive.

Pressure in passage 390 is also applied by passage 450 to below the timer valve 271.

In moving upwards, the 3-4 shift valve moves the regulator plug 257 upwards to exhaust the chamber above the valve through the passage 423 and either passage 416 to the exhaust port between the lands of valve 641 or passage 430 to exhaust through the manual valve. Regulated T-V pressure is thus applied to the valve only upon the relatively small area of the regulator plug 257.

The valve 85 remains in its raised position blocking off direct communication between passages 305 and 308.

Shift Fourth to Third

The transmission will continue in fourth gear ratio until G-1 pressure on the 3-4 shift valve and G-2 pressure on the governor plug 254 fall sufficiently to allow regulated T-V pressure on the regulator plug 257 and spring pressure to move the valve downwards. This occurs at a lower speed than the speed at which shift from third to fourth gear ratio occurs, as the area on which regulated T-V pressure acts is greater in the latter case.

In the lower position of the valve 250, the passage 410 is again connected to exhaust port 317 to exhaust the passages 390, 391, 392 and 450 and to allow the over-run control valve 75 to rise. The front unit clutch C is released and the front unit brake band 18 is applied as described above under "Shift Second to Third," except that oil under pressure in passage 305 cannot pass directly to passages 308, 308' and 309 to apply the brake band 18 but passes through the restricted orifice 306 as the valve 85 is in its closed position. This enforces a delay in the application of the front unit brake band 18 during release of the front unit clutch C, so that there is a short period when there is no drive through the front unit. This permits the engine to speed up so that when the front unit brake band 18 is applied, the engine speed corresponds to the vehicle speed with the front unit in reduction drive and the rear unit in direct drive.

Shift Third to Second

If G-1 pressure on governor plug 241 and G-2 pressure on auxiliary governor plug 238 fall sufficiently to allow the spring to move the 2-3 shift valve downwards, the transmission will shift into second gear ratio. This occurs at a lower speed than the speed at which shift from second to third gear ratio occurs, as regulated T-V pressure is not applied to the valve in the former case.

In the lower position of the valve 235, the passage 315 is connected to exhaust port 317 to exhaust the rear clutch apply passage 310 and release the clutch D. At the same time the rear brake release passage 290 is exhausted through the manual valve and passage 310 to permit compensator pressure and springs in the rear unit servo mechanism to apply the rear brake band 29. As the piston 111 moves to the left the passage 650 is connected to the exhaust port to the right of the piston and the valve 85 is depressed by pressure acting in the groove 88' upon the upper land 88. The lower end of the double transition valve 210 is also exhausted through passages 292 and 290 and pressure in passage 297 from the 1-2 shift valve (which is in its upper position) acts on the land 214 of the double transition valve to move it downwards. In this lower position, pressure in passage 297 from passage 295 is applied through passages 390, 391 and 392 to engage the front unit clutch C and release the front unit brake band 18 as described above under "Shift First to Second." There is no delay in forcing oil out from below piston 61 as the valve 85 is depressed to open passage 308 to passage 305.

The front unit is in direct drive and the rear unit is in reduction drive.

Pressure is also exhausted from the lower end of the 1-2 shift valve through passages 294, 292, 290, 310, 311, 312, 315 and 316 to exhaust port 317 to release this shift valve for independent operation.

Shift Second to First

If the vehicle speed continues to fall, G-1 pressure applied to the piston 224 of the 1-2 shift valve 220 and the governor plug 225 becomes too small to prevent regulated T-V pressure on the regulator plug 230 moving the 1-2 shift valve downwards. This occurs at a lower speed than the speed at which shift from first to second gear ratio occurs as regulated T-V pressure is applied to the larger area of the valve piston in the latter case.

In the lower position of the valve 220, the passage 297 is connected to exhaust port 317 to exhaust the passages 390, 391, 392 and 450 to release the clutch C and allow pressure in the passages 308 and 309 to apply the brake band 18 as described above under "Shift Second to Third." Both units are in reduction drive.

Forced Downshift Fourth to Third

If it is desired to increase the acceleration of the vehicle below a certain speed, this can be obtained by a "kickdown" or forced downshift. The accelerator pedal is moved to and beyond full throttle opening. Full throttle opening occurs when the valve 641 is moved to cut off passage 416 from exhaust 642 and connect line pressure via line 400 and branch 643 to downshift line 416. Forced downshift pressure is applied above the shuttle valve 260, the regulator plug 245 and the governor plug 225. The shuttle valve is depressed and directs pressure through port 417, passage 419, port 418 and passage 423 to below the plug 257 which is in its upper position. Line pressure acting on the valve 250 and the spring 258 overcome G-1 pressure below the valve and G-2 pressure below the plug 254 to force the 3-4 shift valve 250 downwards to re-establish third gear ratio by exhausting passage 410 as described above under "Shift Fourth to Third."

Exhaust of passage 410 involves exhaust of passage 450 through passage 390 so that forced downshift pressure in passage 441 depresses the timer valve 271 against the spring 275.

Governor Enforced Upshift Third to Fourth

As long as the throttle is maintained in this position, the transmission will continue in third gear ratio until a high vehicle speed resulting in excessive engine speed is attained. Then G-2 pressure applied to below the overcontrol valve 377 lifts the valve to apply G-1 pressure to the passage 386 and to below the governor plug 254 to lift the shift valve 250 to cause a shift from third to fourth gear ratio. This prevents excessive engine speed.

Forced Downshift Third to Second

If the vehicle is in third gear ratio and additional acceleration is desired, for example on a steep hill, the throttle is held past the full open position until the pressure in the passage 416 and branch passages 440 and 441 moves the regulator plug 245 and shift valve 235 downwards against the governor pressures on the regulator plugs 238 and 241. Movement of the valve opens the port 343 to connect the chamber above the valve to the regulated T-V pressure passage 344. The regulated T-V pressure and line pressure are equal at full throttle so that the pressures at each end of the regulator plug 245 are equal and the spring 246 returns the plug to its upper position. Forced downshift pressure is applied through passages 362, 361 and 360 to above the land 215 of the double transition valve 210.

Movement of the 2–3 shift valve 124 downwards connects the passage 315 to exhaust port 317 to commence exhaustion of the passages 290, 292, 294, 310 and 311 through the restricted orifice 318 and passage 320 as the passage 312 is closed by the land 272. Oil from the cylinder of the rear unit clutch piston 105 and from the rear unit brake band release passage 290 passes through the restricted orifice 318 to exhaust. The change of drive in the rear unit is thus retarded.

The drop in pressure in the passage 292 allows pressure in passages 357, 297 and 360 to move the double transition valve downwards, to connect the passage 297 from the 1–2 shift valve 220 with the passage 390 to cause engagement of the front unit clutch C and release of the brake band 18 to establish direct drive in the front unit, as described above under "Shift First to Second."

Oil forced from under piston 61 through the passage 308 at first passes through restricted orifice 306, but as soon as the piston 111 of the rear unit servo mechanism 110 has moved to connect the passage 650 to exhaust to the right of the piston, the valve 85 is depressed and oil flows freely to the passage 305. Thus there is a quick transition in the front unit from reduction to direct drive.

When the pressure applied to the front unit servo mechanism 60 through the passage 390 has caused full release of the brake band, oil under pressure is applied through passage 450 to below the timer valve 271 and with the assistance of the spring 275 moves the valve upwards, to establish a bypass through the passage 312 to the restricted orifice 318 so that the oil remaining in the clutch and brake cylinders of the rear unit are quickly exhausted to establish reduction drive in the rear unit.

*Forced Downshift Second to First*

If the transmission is in second gear ratio and a shift to first gear ratio is desired, the throttle is moved beyond the full open position and the pressures will be applied as described above. If the vehicle road speed is sufficiently low, regulated T-V pressure on the regulator plug 230, spring pressure on the 1–2 shift valve 220 and pressure on land 226 of governor plug 225 overcome G–1 pressure applied to the piston 224 of the valve and to the governor plug, to shift the valve downwards. In this position the passage 295 is cut off from the passage 297, which is connected to exhaust 317. This causes exhaust of the fluid to establish reduction drive in the front unit as described above under "Shift Second to First."

The rear unit remains in reduction drive.

If the throttle is held in the "forced downshift" position after the shift to a lower gear ratio, the transmission will remain in this gear ratio until the road speed has increased sufficiently for the engine speed to approach an excessive speed, when the governor pressures will overcome the opposing pressure to move the appropriate shift valve upwards to effect a shift to a higher gear ratio. If, on the other hand, the road speed diminishes, as on a steep hill, forced downshifts to lower gear ratios will occur successively.

Alternatively, the throttle may be released and the upshifts subsequent to the forced downshift will occur at the normal speeds having regard to the throttle setting.

*Drive Range Three*

If the transmission is in fourth gear ratio and the manual valve is moved to the DR3 position, pressure from passage 299 is applied to the passage 430 from which it enters between the lands of the governor plug 254 to oppose governor pressure through passage 386 and through passage 431 to lift the shuttle valve 260 to apply pressure through port 418 and passage 423 to above the 3–4 shift valve 250 to force the valve downwards to re-establish third gear ratio as described above under "Shift Fourth to Third."

The overcontrol valve 377 is operative, if excessive engine speed results, to direct G–1 pressure in place of G–2 pressure to the passage 386 when the vehicle speed is relatively high, for example, seventy-five miles per hour.

The vehicle can be started from rest with the manual valve in the DR3 position and in this case the shifts or gear ratio will occur in the transmission as described above under Drive Range Four until the transmission is in third gear ratio. In this ratio, the transmission is prevented from shifting into fourth gear ratio as described above, until the vehicle speed is such that the engine speed is almost excessive, when the governor pressures will enforce an upshift from third to fourth gear ratio. "Forced downshift" from third to second and from second to first gear ratios can be obtained in Drive Range Three.

*Low Range*

If the vehicle is in third gear ratio and the manual valve is moved to the LO position, pressure is admitted from the passage 44 to the passage 460 from which it enters the passage 461 leading to above the auxiliary governor plug 238 to assist spring pressure and regulated T-V pressure to move the 2–3 shift valve 235 downwards to connect passage 315 to the exhaust port 317. This effects a shift from third to second ratio as described above under "Shift Third to Second."

Pressure in passage 460 is also applied through passage 462 to below land 464 of the overcontrol valve 377. This assists G–2 pressure below the valve to lift the valve when the vehicle speed in second gear ratio gives rise to an excessive engine speed, for example, at forty-five miles per hour. The action is similar to that described above under "Governer Enforced Upshift Third to Fourth"; the G–1 pressure is applied to below the governor plug 238.

If the transmission is in fourth gear ratio and the manual valve is moved to the LO position from the DR4 position, the DR3 position is passed, so that 3–4 shift valve is moved downwards to cause a shift from fourth to third gear ratio before the third to second shift.

The vehicle can be started from rest with the manual valve in the LO position and in this case the transmission will operate in first gear ratio until an automatic shift to second gear ratio occurs as described above under "Shift First to Second," after which the transmission remains in second gear ratio, unless a dangerously high engine speed is reached when governor pressures enforce an upshift.

*Reverse*

When the vehicle is at rest, the manual valve can be moved to the REV position to apply pressure from passage 44 to the passages 550 and 551 leading to the chamber for the reverse brake piston 152 to apply the reverse brake G. Pressure is also applied through the passage 290 to release the rear unit brake band 29.

Pressure is also applied through the passage 552 to a second control plug of pump 40, changing the capacity thereof so that delivered pressure of the pump is higher than in any of the forward drive ranges. The passage 552 also leads to below the compensator valve 204 to force it upwards to cut off compensator pressure.

The transmission is in reverse, the front unit being in reduction drive, the rear unit free to rotate and the reverse unit in reduction drive. The higher pump pressure developed by pump 40 is needed to ensure that the reverse cone brake G is held against rotation under the added reaction load.

As the LO and REV positions of the manual lever are adjacent, the car can be rocked under light throttle by moving the manual valve from one position to the other. So long as predetermined speeds in either direction are not exceeded, so that the reverse blocker piston 368 re-

23 mains inactive, this maneuver can be effected to assist in difficult driving conditions, such as mud, snow and sand.

In this case, the rear servo exhaust valve 140 is particularly useful as it permits a rapid emptying of the chamber and application of the rear unit brake band 29.

Exhaust of the System

If the manual valve is moved to N position and the engine stopped, the pump 40 ceases to deliver the line pressure and pressure in passage 44 acting on the lower end of the exhaust valve 287 is overcome by the spring 289 to lower the valve. Such downward movement of the valve opens the passage 299 to exhaust port 600, permitting oil throughout the system to be exhausted without return through the front pump. As the manual valve is in N position, oil which had been supplied to the front unit servo mechanism for application of the brake band through the passage 305 and branch passages 308 and 309 is now exhausted through the open lower end of the bore of the manual valve. The passage 390 to the front clutch C is exhausted through the double transition valve 210, the passage 297, the 1–2 shift valve 220 and the passage 316 to exhaust port 317. The passage 310 leading to the rear unit clutch D is exhausted at the open upper end of the manual valve. The reverse unit brake G has its supply passage 551 connected to exhaust by the passage 550 and the open lower end of the manual valve. Any oil under pressure in the rear unit servo mechanism is exhausted through the passage 290, the manual valve and the passage 299 to the exhaust valve 287. The rear unit brake band 29 is applied by spring pressure so that when the parking pawl engages the external teeth on the reverse unit internal gear 34 the transmission is locked for parking.

The engine can be stopped with the manual valve in any of its positions but cannot be started again until the manual valve is placed in N position, thereby preventing inadvertent operation of the transmission upon starting.

The modified power plant illustrated in FIGURE 3 employs gasifier pressure for both the normal throttle valve pressure and the engine pressure control of the transmission. The power plant has a gas turbine engine 701 including a compressor 702 located in a compressor housing 703 having an inlet 704 and an outlet 706 connected to a duct 707. A burner 708, located in the duct 707, is supplied with fuel by a supply line 709 under the control of a fuel control mechanism such as the above described fuel control 9. The hot gases from the burner 708 are conducted through the duct 707 to the entrance nozzle 711 which directs the gases to the compressor turbine 712 which drives the compressor shaft 714 and compressor 702. The gases leaving the compressor turbine 712 pass through intermediate nozzle 716 to drive the power output turbine 717 connected to drive the output shaft 718. The exhaust gases are conveyed away by exhaust duct 719 which may be connected to a heat regenerative system.

Output shaft 718 is connected through a reduction gear 721 to the transmission input shaft 722 which drives the sun gear 723 of a planetary gearset 724. Though only a two ratio planetary transmission is illustrated, it will be appreciated that more ratios may be provided as shown, for example, in S.N. 554,866, filed December 22, 1955 or S.N. 731,047, filed April 25, 1958, now Patent No. 3,053,116. The planetary gearset has planetary pinions 726 mounted on a carrier 727 fixed to the output shaft 728 which mesh with the sun gear 723 and a ring gear 729. To provide reduction ratio drive through the gearing, the multiplate brake 731 is engaged by a fluid motor 732 when fluid is supplied by line 733. To engage direct drive, the clutch 734 connected between the input shaft 722 and the ring gear 729 is engaged by the fluid motor 736 when fluid is supplied by line 737. A governor 738 of the flyball or Pitot type is connected to the output shaft 728 to supply a governor pressure proportional to output shaft speed to line 739.

Fluid is supplied to the control system from a sump 741 via inlet line 742 by a pump 743. It is preferred that both transmission input and output and compressor driven pumps be employed as in the above modification to supply fluid under pressure to the main line 744 during all phases of transmission operation.

The pressure in the main line is regulated by a pressure regulator valve 746 having a valve element 747 with lands a, b of equal diameter mounted in a bore 748. Main line 744 has a branch 751 passing below land b to urge the valve upwardly against the biasing force of spring 752, to regulate the main line pressure at a constant value. The excess fluid is initially on the first movement of the valve 747 exhausted by exhaust 754 and the further excess exhausted via main line branch 756 between the lands a and b to exhaust 757. The spring chamber portion of the bore is connected to exhaust 758 to prevent accumulation of fluid in this chamber. At the upper end of the bore and within the closure there is a small control bore 761 for the piston 762, which when actuated by fluid under torque signal pressure supplied by line 763 engages the upper end of valve element 747 to assist the biasing forces of spring 752 to increase the main line pressure proportional to gasifier pressure. The orifice 764 in line 763 prevents abrupt control changes in main line pressure.

A gasifier pressure line 766 is connected to the gasifier chamber or compressor outlet portion 706 of the gas turbine engine ducting 707. One branch 767 of gasifier line 766 is connected to a throttle valve 768. The throttle valve 768 includes a throttle regulator valve element 769 having lands a and b of equal diameter located in a bore 771. It has also a downshift valve 772 having lands a and b of equal diameter located in the same bore with a spring 773 interposed between the throttle regulator valve 769 and the downshift valve 772.

These valves are controlled by a downshift piston or plug 776 located in a large bore 777 and a throttle regulator plug 778 located in a small bore 779. Surrounding the land b of the downshift valve 772 there is an enlarged chamber 781 having a larger diameter than the bore 777. A stop ring 782 is slidably mounted in the chamber 781 and biased by a spring 783 to a normal position in contact with a shoulder 784. The throttle pressure line or torque pressure line 786 is normally connected to the end of the bore 771 to act on land a of valve element 769 and to port 787 between the lands a and b of valve element 769. The space between the lands a and b is at times exhausted by exhaust 788 while the spring chamber for the spring 773 is always connected to exhaust 789. The throttle torque pressure line 786 is also connected to port 791 blocked by the land a of valve element 772. A port 792 is connected to the downshift line 793. The port 792 is also provided with an orifice exhaust 794.

When the throttle pedal 796 is moved at or beyond the normal maximum torque or power position and no longer actuates the fuel control, further movement thorugh the detent position shown in dotted lines moves the element 797 of valve 798 from the normal position shown where the gasifier downshift line 801 is connected to exhaust 802 downwardly to the downshift position connecting the gasifier branch 803 between the lands of valve 797 to line 801 to bore 777 to act on the plug 776.

During gas turbine operation with the throttle in the normal fuel control range, the gasifier pressure supplied via line 766 and branch 767 acts on the plug 778 to provide through plug 776 and valve 772 a force to increase the biasing force of spring 773 on valve element 769. In the absence of gasifier pressure, the spring force will move the valve 769 upwardly to connect the main line branch 790 between lands a and b to the torque signal line 786 closing exhaust 788 to fill the line 786 and regulate the pressure substantially at zero or at a low pressure. The pressure in the torque signal line 786 will be regulated at a pressure proportional to the gasifier pressure. Increasing gasifier pressure will provide increasing torque signal pressure. The areas of the regulator valve 769 and the plug 778 are selected so that over the range of increasing gasifier pressure the plug 776 will engage the stop ring 782 at about 95% of maximum torque output. In this way at the maximum torque output under adverse conditions the pressure in torque pressure line 786 will increase to the maximum. Thus at full throttle under all operating conditions the plugs 778 and 776 will have reached the normal operating limit of their movement engaging stop 782.

If it is desired to provide a forced downshift the throttle pedal 796 is moved beyond the maximum power position as shown in full lines to the downshift position shown in dotted lines to move the valve element 797 from the position shown connecting line 801 to exhaust 802 to connect the gasifier pressure line 803 to line 801 to act on the plug 776. This pressure, though the same as the pressure supplied to the plug 778, acts on a larger area and will move the plug 776 against the force of the spring 783 to provide a further increase in the biasing force supplied to spring 773 to provide a substantial increase in the pressure in line 786. This pressure is then connected between the lands *a* and *b* of valve 772 to port 792 and downshift line 793.

SHIFT VALVE

The transmission is controlled by a shift valve 806 having a valve element 807 having lands *a*, *b* and *c* located in a bore 808. To provide hysteresis, the land *c* may be smaller than the land *a* and land *b*. The land *a* may also cut off the supply of torque pressure via line 786 to the upper end of valve bore. Both ends of the bore are closed. At the upper end a biasing spring 811 normally biases valve element 807 to the downshift position shown connecting main line 751 between lands *a* and *b* to the low ratio line 733. The high ratio line 737 is connected between lands *b* and *c* to exhaust 812. When the governor pressure in line 739 reaches a predetermined value for each throttle torque pressure, governor pressure acts on the bottom of land *c* to raise the valve against the biasing spring 811 to connect main line 751 to the high ratio line 737 and connect the low ratio line 733 to exhaust 814. If a stepped land *c* is employed as shown, exhaust 816 should be provided to prevent fluid lock. The downshift line 793 is connected to bore 808 above land *a* in all valve positions, and on movement of the accelerator pedal 796 to the downshift position will provide downshift pressure to provide a forced downshift of valve 806. If it is not desired to cut off the supply of torque pressure via line 786 to valve 806 on upshift of this valve, the torque signal line 786 may be connected to valve 806 at the end of the bore where downshift line 793 is now connected and downshift line 793 may be eliminated, since the throttle valve in the downshift position provides downshift pressure to the torque signal line 793.

OPERATION

When the engine is started and operating at a low idling speed, it is preferred that the engine provide insufficient power to drive the static load of the vehicle. Thus the load will hold the power output turbine 717 stationary. The auxiliary pump of the fluid pressure supply pumps 743 driven by the compressor shaft 714 will supply fluid to the system at a pressure regulated by pressure regulator valve 746. The torque valve 768 will be acted on by a low gasifier pressure acting on plug 778 to provide a very low torque pressure. The torque pressure will act on the regulator valve and raise main line pressure to a very small degree. The shift valve 806 will be in position shown connecting main line 751 to the low ratio line 733 to engage low ratio in the gear unit. If the vehicle is not moving there will not be any governor pressure in line 739 to tend to upshift valve against the biasing force and the torque pressure signal. As the throttle is advanced from the zero or idle position toward the maximum power position, the engine will be accelerated increasing the gasifier pressure in line 767 to provide a torque pressure increasing proportionally to gasifier pressure. The torque pressure signal will also act on the plug 762 of the main line regulator valve 746 to increase the main line pressure proportional with the torque pressure signal and gasifier pressure or turbine output torque. When the vehicle reaches a predetermined speed, at any particular torque output condition of the engine, the governor pressure supplied via line 739 will upshift the shift valve 806 against the biasing force of spring 811 and the torque pressure supplied via line 786. When the shift valve is shifted the low ratio engaging motor 732 will be connected via line 733 to exhaust 814 to disengage low and the main line 751 will be connected to line 737 to engage the high ratio.

In high ratio if it is desired to provide a forced downshift, the throttle pedal 796 is moved beyond the maximum power position shown in full lines to the downshift position shown in dotted lines to disconnect line 801 from exhaust 802 and connect gasifier pressure supplied by line 803 through valve 798 to line 801 to act on plug 776 to supply sufficient force to move the plug and stop ring 782 to provide an increased pressure in the torque signal line 786. This pressure is connected through valve 772 to the downshift line 793. When the shift valve upshifts, it cuts off torque signal line 786. The downshift line 793 is connected to the end of the chamber to act on land *a* of the shift valve element 807 in the upshift position, to provide a forced downshift to the low position shown.

It will be appreciated that the above described specific embodiments are illustrative of the invention and that modifications may be made within the scope of the appended claims.

We claim:

1. In a transmission for a gas turbine engine having a compressor with compressor outlet passage, a multiratio transmission, torque pressure signal means operatively connected to said gas turbine compressor outlet passage to provide a torque signal proportional to gas turbine pressure discharge, and shift control means operatively connected to said multiratio transmission and said torque pressure signal means to control the ratio of said multiratio unit and operatively controlled by said torque signal to selectively control said multiratio transmission.

2. The invention defined in claim 1 and said torque signal pressure controlling the engaging force of said shift control means.

3. The invention defined in claim 1 and said torque signal pressure controlling the shift action of said shift control means.

4. In a transmission for a gas turbine engine having a compressor with compressor outlet passage, a multiratio transmission, a torque pressure signal means operatively connected to said gas turbine compressor outlet passage to provide a torque signal proportional to gas turbine pressure discharge, and shift control means operatively connected to said multiratio transmission and said torque pressure signal means to control the ratio of said multiratio unit and operatively controlled by said torque signal to selectively control said multiratio transmission in accordance with torque to selectively provide a plurality of ratios.

5. In a transmission for a gas turbine engine having a compressor with compressor outlet passage, a multiratio transmission, torque pressure signal means operatively connected to said gas turbine compressor outlet passage to provide a torque signal proportional to gas turbine pressure discharge, a governor providing a governor signal proportional to the speed of said transmission, and shift control means operatively connected to said multiratio transmission to control the ratio of said multiratio unit and operatively connected to said governor and said torque pressure signal means for control by said governor signal and said torque signal to selectively control said multiratio transmission in accordance with speed and torque to selectively provide a plurality of ratios.

6. In a transmission for a gas turbine engine having a compressor with an output passage, a fluid actuated multiratio transmission, a source of fluid under pressure, a torque pressure signal regulator valve operatively connected to receive fluid from said source and operatively connected to said gas turbine compressor output passage to provide a torque signal pressure proportional to gas turbine pressure discharge, and a pressure regulator valve operatively connected to said source and to said torque pressure signal regulator valve for regulating the pressure of the source at a pressure proportional to said torque signal pressure.

7. In a transmission for a gas turbine engine having a compressor with an output passage, a fluid actuated multiratio transmission, a source of fluid under pressure, a torque pressure signal regulator valve operatively connected to receive fluid from said source and operatively connected to said gas turbine compressor output passage to provide a torque signal pressure proportional to gas turbine pressure discharge, and shift valve means operatively connected to control the supply of fluid from said source to said fluid actuated multiratio transmission and operatively connected to said torque pressure signal regulator valve for control by said torque signal pressure to selectively control the supply of fluid from said source to said fluid actuated multiratio transmission in accordance with torque to selectively provide a plurality of ratios.

8. In a transmission for a gas turbine engine having a compressor with an output passage, a fluid actuated multiratio transmission, a source of fluid under pressure, a torque pressure signal regulator valve operatively connected to receive fluid from said source and operatively connected to said gas turbine compressor output passage to provide a torque signal pressure proportional to gas turbine pressure discharge, a governor providing a governor signal pressure proportional to the speed of said transmission, and shift valve means operatively connected to control the supply of fluid from said source to said fluid actuated multiratio transmission and operatively connected to said torque pressure signal regulator valve for control by said governor signal pressure and said torque signal pressure to selectively control the supply of fluid from said source to said fluid actuated multiratio transmission in accordance with speed and torque to selectively provide a plurality of ratios.

9. In a transmission for a gas turbine engine having a compressor with an output passage, a fluid actuated multiratio transmission, a source of fluid under pressure, a torque pressure signal regulator valve operatively connected to receive fluid from said source and operatively connected to said gas turbine compressor output passage to provide a torque signal pressure proportional to gas turbine pressure discharge, a pressure regulator valve operatively connected to said source and said torque pressure signal regulator valve for regulating the pressure of the source at a pressure proportional to said torque signal pressure, a governor providing a governor signal pressure proportional to the speed of said transmission, and shift valve means operatively connected to control the supply of fluid from said source to said fluid actuated multiratio transmission and operatively connected to said governor and said torque pressure signal regulator valve for control of said governor signal pressure and said torque signal pressure to selectively control the supply of fluid from said source to said fluid actuated multiratio transmission in accordance with speed and torque to selectively provide a plurality of ratios.

10. In a power plant, a gas turbine engine having a compressor, a compressor output passage and a power turbine, a multiratio transmission connecting said power turbine to a load, a torque pressure signal means operatively connected to said gas turbine compressor output passage to provide a torque signal proportional to gas turbine pressure discharge, a governor providing a governor signal proportional to transmission speed, and shift valve means operatively connected to said multiratio transmission to control said multiratio transmission and operatively connected to said governor and said torque pressure signal means for control by said governor signal and said torque signal to selectively control the ratio of said multiratio transmission in accordance with speed and torque to selectively provide a plurality of ratios.

11. In a power plant, a gas turbine engine having a compressor, a compressor output passage and a power turbine, a fluid actuated multiratio transmission connecting said power turbine to a load having an output shaft, a source of fluid under pressure, a torque pressure signal regulator valve operatively connected to receive fluid from said source and operatively connected to said gas turbine compressor output passage to provide a torque signal pressure proportional to gas turbine pressure discharge, a pressure regulator valve operatively associated with said torque pressure signal regulator valve regulating the pressure of the source at a pressure proportional to said torque signal pressure, a governor providing a governor signal pressure proportional to speed of said output shaft, and shift valve means operatively connected to control the supply of fluid from said source to said fluid actuated multiratio transmission and operatively associated with said governor and torque pressure signal regulator valve for control by said governor signal pressure and said torque signal pressure to selectively control the supply of fluid from said source to said fluid actuated multiratio transmission in accordance with speed and torque to selectively provide a plurality of ratios.

12. In a power plant, a gas turbine engine having a compressor, a compressor output passage and a power turbine, a fluid actuated multiratio transmission connecting said power turbine to a load having an output shaft, a source of fluid under pressure, a torque pressure signal regulator valve operatively connected to receive fluid from said source and operatively connected to said gas turbine compressor output passage to provide a torque signal pressure proportional to gas turbine pressure discharge, a pressure regulator valve operatively associated with said torque pressure signal regulator valve regulating the pressure of the source at a pressure proportional to said torque signal pressure, a governor providing a governor signal pressure proportional to the speed of said transmission, and shift valve means operatively connected to control the supply of fluid from said source to said fluid actuated multiratio transmission and operatively associated with said governor and torque pressure signal regulator valve for control by said governor signal pressure and said torque signal pressure to selectively control the supply of fluid from said source to said fluid actuated multiratio transmission in accordance with speed and torque to selectively provide a plurality of ratios.

13. In a power plant, a gas turbine engine having a compressor, a compressor output passage and a power turbine, a fluid actuated multiratio transmission connecting said power turbine to a load, a source of fluid under pressure, a torque pressure signal regulator valve operatively connected to said gas turbine compressor output passage to provide a torque signal pressure proportional to gas turbine pressure discharge, a governor providing a governor signal pressure proportional to speed, shift valve means operatively connected to control the supply of fluid from said source to said fluid actuated multiratio transmission and operatively associated with said governor and torque pressure signal regulator valve for control by said governor signal pressure and said said torque signal pressure to selectively control the supply of fluid from said source to said fluid actuated multiratio gear unit in accordance with speed and torque to selectively provide a plurality of ratios, and manually actuated means operable at will to connect said source to said shift valve means and operative to move said shift valve from a higher ratio position to a lower ratio position.

14. In a transmission for a gas turbine engine having a compressor outlet passage, a multiratio transmission having a low and a high ratio, a source of fluid under pressure, a pressure regulator valve connected to said outlet passage and said source providing a torque pressure proportional to the pressure in said outlet passage and varying between predetermined limits, a manual downshift control operatively connected to said pressure regulator valve to increase the torque pressure to a higher downshift pressure value, means to provide a transmission speed signal, shift control means connected to said pressure regulator valve, said means to provide a transmission speed signal and said multiratio transmission actuated by said torque pressure when varying between said predetermined limits and by said transmission speed signal to shift said multiratio transmission between said low and high ratio and operative to place said multiratio transmission in said low ratio in response to said higher downshift pressure value.

15. In a transmission for a gas turbine engine having a compressor outlet passage, a multiratio transmission having a low and a high ratio, a source of fluid under pressure, pressure regulator means including a regulator valve having biasing means providing a biasing force on said regulator valve, said pressure regulator means being connected to said source to provide a torque signal pressure proportional to the force of said biasing means, first expansible chamber means connected to said outlet passage and operatively connected to said biasing means to increase the biasing force and torque signal pressure proportional to the outlet passage pressure within predetermined limits, and a second expansible chamber connected to said outlet passage and operatively connected to said biasing means to increase said biasing force beyond the upper of said limits to a higher downshift pressure value, a manual downshift valve operatively associated with said outlet passage and said second expansible chamber controlling the flow from said outlet passage to said second expansible chamber to increase the biasing force and torque pressure to said higher downshift pressure value, means to provide a transmission speed signal, shift control means connected to said pressure regulator means, said means to provide a transmission speed signal and said multiratio transmission actuated by said torque pressure signal when varying between said predetermined limits and said transmission speed signal to shift said multiratio transmission between said low and high ratio and operative to normally place said multiratio transmission in said low ratio in response to said higher downshift pressure value.

16. In a transmission for a gas turbine engine having a compressor outlet passage, a multiratio transmission having a low and a high ratio, a source of fluid under pressure, pressure regulator means including a regulator valve having biasing means providing a biasing force on said regulator valve, said pressure regulator means being connected to said source to provide a torque signal pressure proportional to the force of said biasing means, first expansible chamber means connected to said outlet passage and operatively connected to said biasing means to increase the biasing force proportional to the outlet passage pressure and having means to limit the increase in the biasing force and said torque signal pressure, and a second expansible chamber connected to said outlet passage and operatively connected to said biasing means to increase said biasing force beyond said limit to a higher downshift pressure value, a manual downshift valve operatively associated with said outlet passage and said second expansible chamber controlling the flow from said outlet passage to said second expansible chamber to increase the biasing force and torque pressure to a higher downshift pressure value, means to provide a transmission speed signal, shift control means actuated by said torque pressure signal when varying to said predetermined limit and said transmission speed signal to shift said multiratio transmission between said low and high ratio and operative to normally place said multiratio transmission in said low ratio in response to said higher downshift pressure value.

17. In a power plant having a gas turbine engine including a compressor turbine driving a compressor and a power output turbine, a fluid operated transmission having an input driven by said power turbine and an output, a fluid pressure supply system having an auxiliary pump operatively connected to said compressor turbine to be driven by said compressor turbine of said gas turbine engine and transmission pump and control means operatively associated with said transmission to be driven with said transmission and operatively associated with said auxiliary pump to be operative when providing sufficient fluid at the minimum pressure required for transmission operation to disable said auxiliary pump.

18. In a power plant having a gas turbine engine including a compressor turbine driving a compressor and a power output turbine, a multiratio fluid operated transmission having input driven by said power turbine and an output, a fluid pressure supply system having an auxiliary pump driven by said compressor turbine of said gas turbine engine and a transmission pump driven by said transmission output, and means connecting said auxiliary pump and transmission pump responsive to pressure delivered by said transmission pump to unload said auxiliary pump.

19. In a power plant having a gas turbine engine including a compressor turbine driving a compressor and a power output turbine, a multiratio fluid operated transmission having input driven by said power turbine and an output, a fluid pressure supply system having an auxiliary pump driven by said compressor turbine of said gas turbine engine and a transmission pump driven by said transmission, and means connecting said auxiliary pump and transmission pump responsive to the pumping action of said transmission pump to unload said auxiliary pump at a predetermined pumping action of said output pump.

20. In a power plant having a gas turbine engine including a compressor turbine driving a compressor and a power output turbine, a multiratio fluid operated transmission having input driven by said power turbine and an output, a fluid pressure supply system having an auxiliary pump driven by said compressor turbine of said gas turbine engine, an input pump driven by said transmission input and an output pump driven by said transmission output, and means connecting said auxiliary pump and output pump responsive to the pumping output of said output pump to unload said auxiliary pump at a predetermined pumping output of said output pump.

21. In a transmission for a gas turbine engine having a compressor outlet passage for compressor pressure, a multiratio transmission having a low and a high ratio, shift means connected to said multiratio transmission movable between a low and high ratio position to shift said transmission between said low and high ratios, governor means connected to said transmission and to said shift means to provide an upshift force proportional to increasing transmission speed to increase the bias on said shift means to upshift to high ratio position with increasing transmission speed, downshift means connecting said compressor outlet passage to said shift means to provide a downshift force proportional to compressor pressure varying within limits to increase the bias on said shift means to said low ratio position with increasing compressor pressure at the same time as said governor means provides said upshift force proportional to increasing transmission speed, said shift means providing normal upshifts and downshifts in response to simultaneous biasing by said upshift force proportional to transmission speed and said downshift force proportional to compressor pressure, and manual means connected to said downshift means to change said downshift force to a forced downshift force to substantially increase the bias on said shift means to downshift said shift means at a higher transmission speed.

22. The invention defined in claim 21 and said downshift means including a source of fluid pressure and regulator valve means connected to said source and said outlet passage providing a fluid pressure proportional to said compressor pressure in said outlet passage and said manual means controlling the supply of said compressor pressure to said regulator valve means to provide said forced downshift pressure.

23. The invention defined in claim 21 and said downshift means including a source of fluid pressure and regulator valve means with first and second biasing means connected to said source, means normally connecting said outlet passage to supply compressor pressure to said first biasing means to provide a fluid pressure proportional to said compressor pressure and said manual means controlling the supply of said compressor pressure to said second biasing means of said regulator valve means to provide said forced downshift pressure.

References Cited in the file of this patent

UNITED STATES PATENTS

| | | |
|---|---|---|
| 2,728,247 | Snyder | Dec. 27, 1955 |
| 2,875,643 | Kelley | Mar. 3, 1959 |
| 2,953,940 | Slemmons | Sept. 27, 1960 |

FOREIGN PATENTS

| | | |
|---|---|---|
| 218,832 | Australia | Nov. 6, 1958 |
| 849,293 | Great Britain | Sept. 21, 1960 |

UNITED STATES PATENT OFFICE
CERTIFICATE OF CORRECTION

Patent No. 3,093,010                                         June 11, 1963

William M. Spreitzer et al.

It is hereby certified that error appears in the above numbered patent requiring correction and that the said Letters Patent should read as corrected below.

Column 2, line 18, for "o" read -- to --; line 60, for "shofting" read -- shifting --; column 5, line 59, for "rar" read -- rear --; column 10, line 17, for "400" read -- 410 --; lines 31 and 32, strike out "346 to a port 347 of a regulator plug 230 of the 1-2 shift valve 220, through a passage"; line 33, after "250," insert -- and --; same column 10, line 35, for "235" read -- 235; --; column 11, lines 20 and 21, for "pressure" read -- passage --.

Signed and sealed this 21st day of January 1964.

(SEAL)
Attest:
ERNEST W. SWIDER

EDWIN L. REYNOLDS

Attesting Officer                                       Acting Commissioner of Patents